US010535263B2

(12) United States Patent
Michalakis et al.

(10) Patent No.: US 10,535,263 B2
(45) Date of Patent: Jan. 14, 2020

(54) PARKING SCHEDULER AND CAR ROUTER SYSTEM

(71) Applicant: TOYOTA RESEARCH INSTITUTE, INC., Los Altos, CA (US)

(72) Inventors: Nikolaos Michalakis, Saratoga, CA (US); Julian M. Mason, Redwood City, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

(21) Appl. No.: 15/943,028

(22) Filed: Apr. 2, 2018

(65) Prior Publication Data

US 2019/0304306 A1 Oct. 3, 2019

(51) Int. Cl.
| | |
|---|---|
| G01C 21/34 | (2006.01) |
| G08G 1/123 | (2006.01) |
| G08G 1/14 | (2006.01) |
| G01C 21/36 | (2006.01) |
| G07B 15/00 | (2011.01) |
| G07B 15/02 | (2011.01) |
| G06Q 10/00 | (2012.01) |
| B60Q 1/48 | (2006.01) |

(52) U.S. Cl.
CPC ......... *G08G 1/143* (2013.01); *G01C 21/3484* (2013.01); *G01C 21/3667* (2013.01)

(58) Field of Classification Search
CPC ........ G06Q 50/30; G06Q 10/02; G08G 1/142; G08G 1/143; G01C 21/3484; G01C 21/3667; G01C 21/3685; G01C 21/32

USPC ...................... 701/533; 705/13, 5; 340/932.2
See application file for complete search history.

(56) References Cited

U.S. PATENT DOCUMENTS

| | | | |
|---|---|---|---|
| 6,970,101 B1 | 11/2005 | Squire et al. | |
| 8,217,806 B2 | 7/2012 | Kim | |
| 9,443,427 B1 * | 9/2016 | Bhuiya | G06Q 10/02 |
| 2015/0066545 A1 * | 3/2015 | Kotecha | G06Q 10/02 705/5 |
| 2015/0130641 A1 * | 5/2015 | Rahman | G08G 1/142 340/932.2 |
| 2016/0189324 A1 * | 6/2016 | Eramian | G06Q 50/30 705/13 |
| 2017/0046955 A1 | 2/2017 | Shen | |

(Continued)

FOREIGN PATENT DOCUMENTS

| | | |
|---|---|---|
| CN | 104464369 A | 3/2015 |
| JP | 2006-209429 A | 8/2006 |

*Primary Examiner* — Mahmoud S Ismail

(74) *Attorney, Agent, or Firm* — Oblon, McClelland, Maier & Neustadt, L.L.P.

(57) ABSTRACT

Provided is a parking navigation method and system including a vehicle including an in-vehicle computer system having at least one processor and associated memory device, wireless communication circuit, and display. The memory device storing an application program having instructions, the instructions when executed perform a method including: detecting, via the wireless communication circuit, entry into a parking structure, the parking structure including a capability of identifying open parking spaces, synchronizing the vehicle with the parking structure, determining an available parking space in the parking structure, generating a route to the available parking space, displaying a map having a route to the parking space.

16 Claims, 32 Drawing Sheets

(56) References Cited

U.S. PATENT DOCUMENTS

2017/0124875 A1 5/2017 Gupta et al.
2018/0283894 A1* 10/2018 Alneghaimish ........ G08G 1/015

* cited by examiner

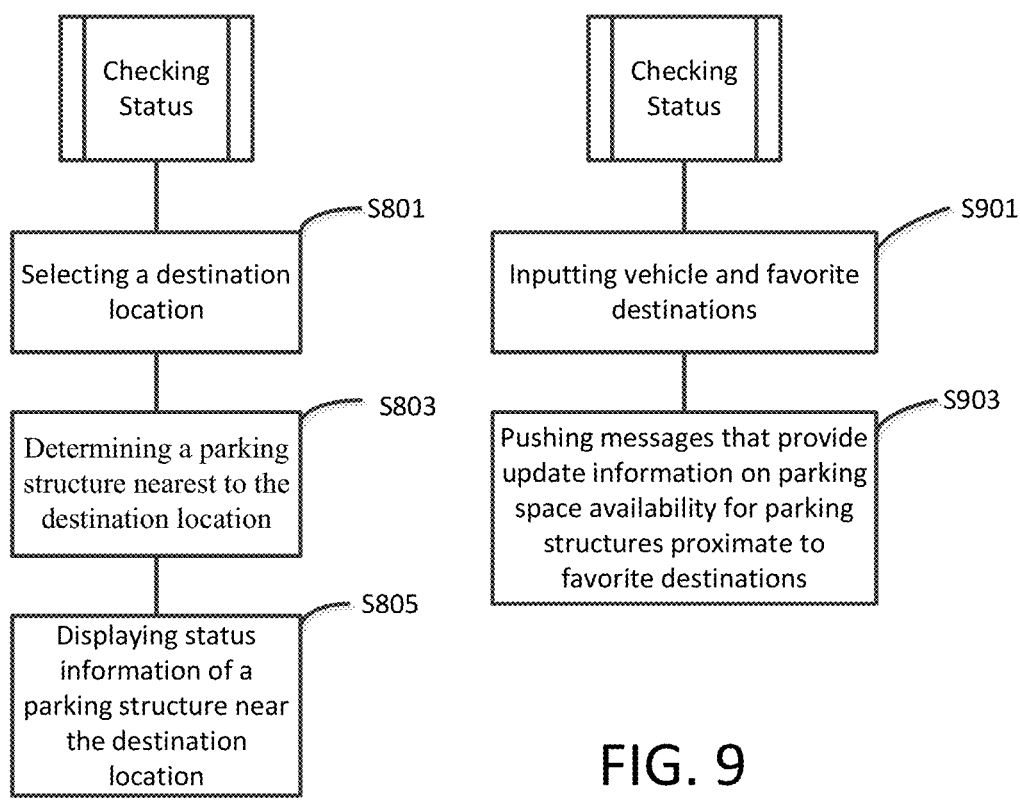

PARKING SCHEDULER AND CAR ROUTER SYSTEM

FIELD OF DISCLOSURE

The present disclosure relates generally to a parking scheduler and car router system for a vehicle in a parking structure, and is applicable to a vehicle infotainment system or a mobile app for a mobile device.

BACKGROUND

Parking structures can be complex when trying to locate a parking space that is near a destination location. Often a driver may be faced with a parking structure that is filled to near capacity and the driver may not be familiar with the layout of the parking structure relative to the destination that the driver seeks to go to. The driver may spend much time driving around aimlessly looking for an available space to park. The driver may turn a vehicle into an aisle that is backed-up due to other vehicles waiting for a space, or other vehicles that are also driving around aimlessly looking for an open space. The driver may settle for a space that is not near the destination that they are going to. The driver may arrive at the parking structure at a time that the structure is generally congested. The driver may be driving an oversized vehicle and be faced with wandering around a parking structure in an attempt to locate a parking space that may accommodate the larger sized vehicle. Thus, there is a need for a system that simplifies the process of locating available parking spaces in parking structures of the type commonly found at shopping malls, city parking garages, airports, college campuses, sports complexes, or associated with office buildings. Such parking structures may be characterized as multi-level parking structures, and distributed parking structures.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 8 is a flowchart for a step of checking status of a parking structure according to an exemplary aspect of the disclosure;

FIG. 9 is a flowchart for a step of checking status of a parking structure according to an exemplary aspect of the disclosure;

DETAILED DESCRIPTION

Figure 1:
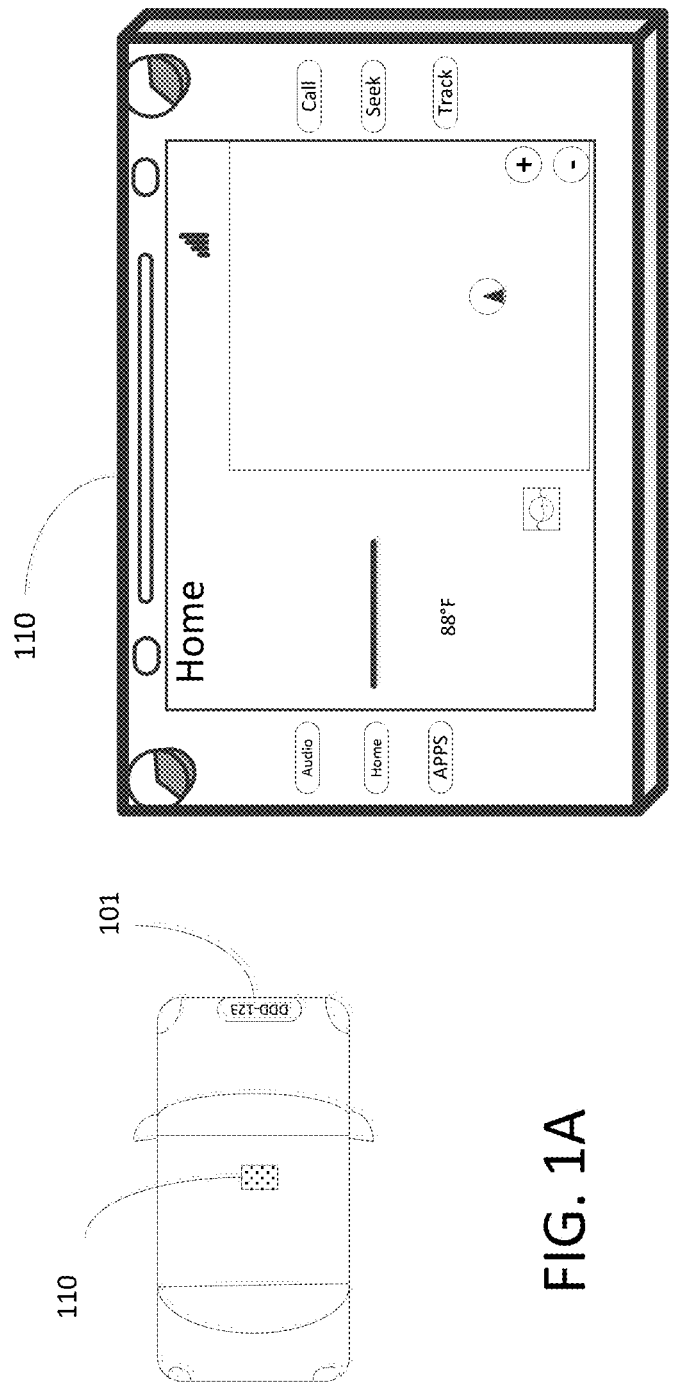
FIG. 1A, 1B is a schematic of a vehicle and a smart display device mounted in the vehicle according to an exemplary aspect of the disclosure.

Referring now to the drawings, wherein like reference numerals designate identical or corresponding parts throughout several views, the following description relates to a parking scheduler and routing system that improves efficiency of locating available parking spaces through a dynamic interface that can be provided on a built-in screen of a vehicle or in mobile app on a mobile device. The system may synchronize a vehicle with a parking structure upon entry to the parking structure and quickly locate a suitable available parking space. The system can prioritize among available parking spaces based on a preferred area or destination. The system can dynamically guide a vehicle on a path to a selected parking space.

FIG. 1A illustrates a vehicle having a built-in display device 110 and a license plate 101 as an identifier, and FIG. 1B illustrates the built-in display device 110. Modern vehicles have built-in smart display devices often located in the center console of the dash. The built-in smart display device 110 provides an interactive interface for various pre-programmed applications, such as radio and cabin environment control, that have previously been available by way of knobs and levers, and newer functions such as GPS, audio, phone connectivity, fuel economy, traffic, and weather, by way of a suite of apps. Because the smart display device 110 can provide information on the status of the vehicle, such as fuel economy, as well as entertainment, such as radio, the smart display device 110 is considered as part of an infotainment system. An example of an infotainment system is Toyota Entune®. In some cases, many of the same functions available in the smart display device 110 are also available for a mobile device. Toyota for example offers an Entune® app.

Figure 2:
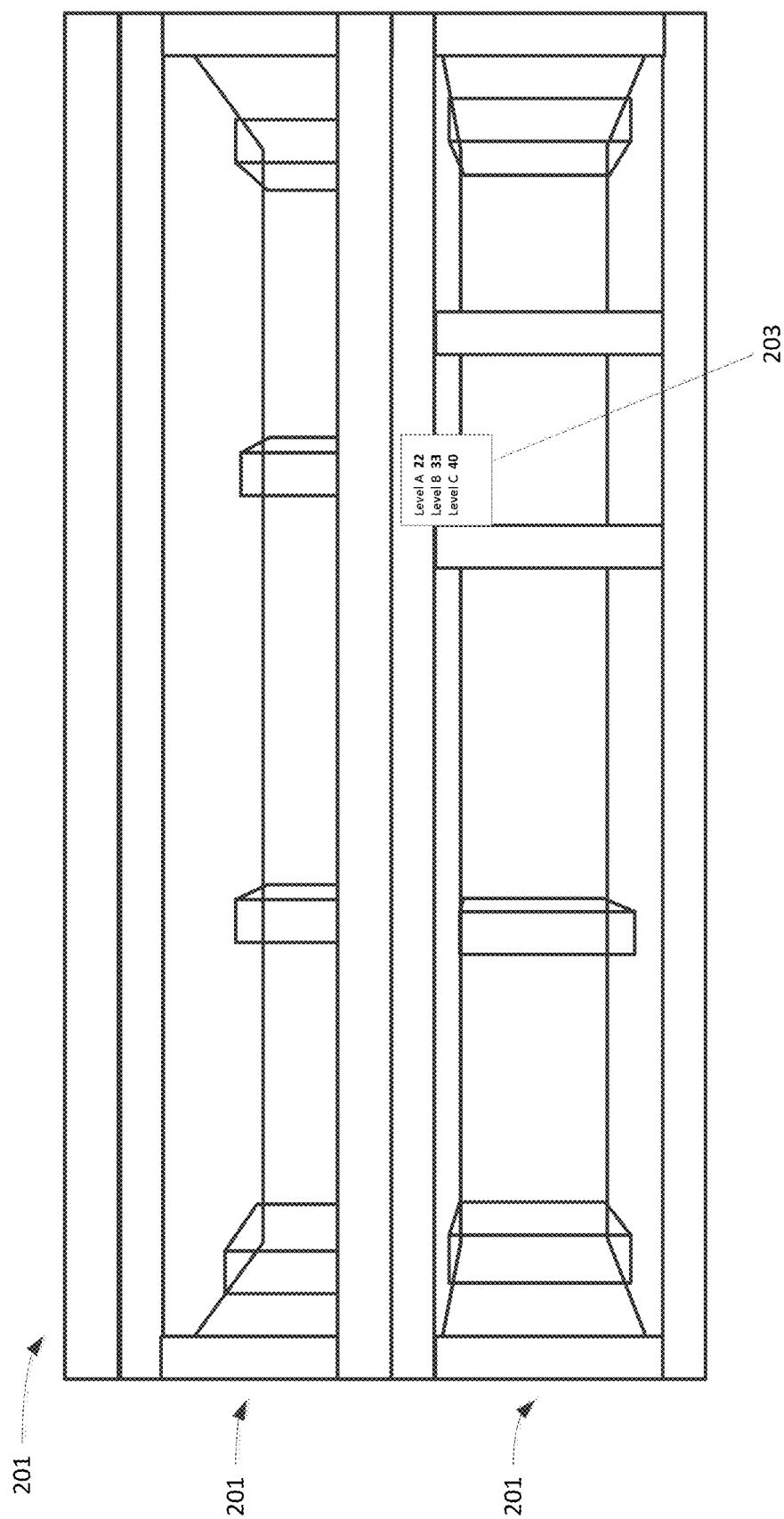
FIG. 2 is a schematic of an example multilevel parking structure according to an exemplary aspect of the disclosure.

FIG. 2 is a schematic of an example multi-level parking structure having two or more levels 201. In some embodiments, when a driver enters a multi-level parking structure, the driver may see a display that shows the number of available parking spaces at each level. For example, the number of available spaces may be presented in an electronic display 203. Although only one electronic display is shown in the example, more than one electronic display 203 may be located at various places in the parking structure. For example, one electronic display may be located at each level of the parking structure, or several electronic displays may be spaced along aisles of the parking structure. The number of available spaces may be sensed by a sensor located at each parking space. The sensor at each parking space may also include an indicator that displays an indication that the space is occupied or is available. In some cases, the indicator is a light that can be of two different colors, one color to indicate that the space is occupied, and another color to indicate that the space is available. Communication between each sensor and the electronic display 203 may be a wired connection or a wireless connection. In some cases, the electronic display 203 and the sensors may be part of a network that provides information to a computer system. In the case of a computer network, the electronic displays 203 may be interconnected, and connected to a computer system by WiFi® wireless communication or cellular. The parking structure may provide WiFi® access throughout the parking structure. The parking structure may include an entrance gate having a communication device for controlling entrance to the parking structure. The communication device may include a reader for reading from a memory device containing an access code, or may include a device for issuing a parking pass. The communication device may include a microphone and speaker for communication with a person.

Although the parking structure of FIG. 2 is in the form of a multi-level structure, this disclosure is not limited to this structure. Other parking structures may include outdoor parking lots in which parking spaces are predefined and may be monitored, or may include street parking spaces that are defined and may include associated location designations. Also, the parking structure of FIG. 2 may be a single level structure that is covered. Covered structure may provide for simpler mounting of cameras and display devices, provide a readily available source of power, as well as be protected from weather.

Figure 3:
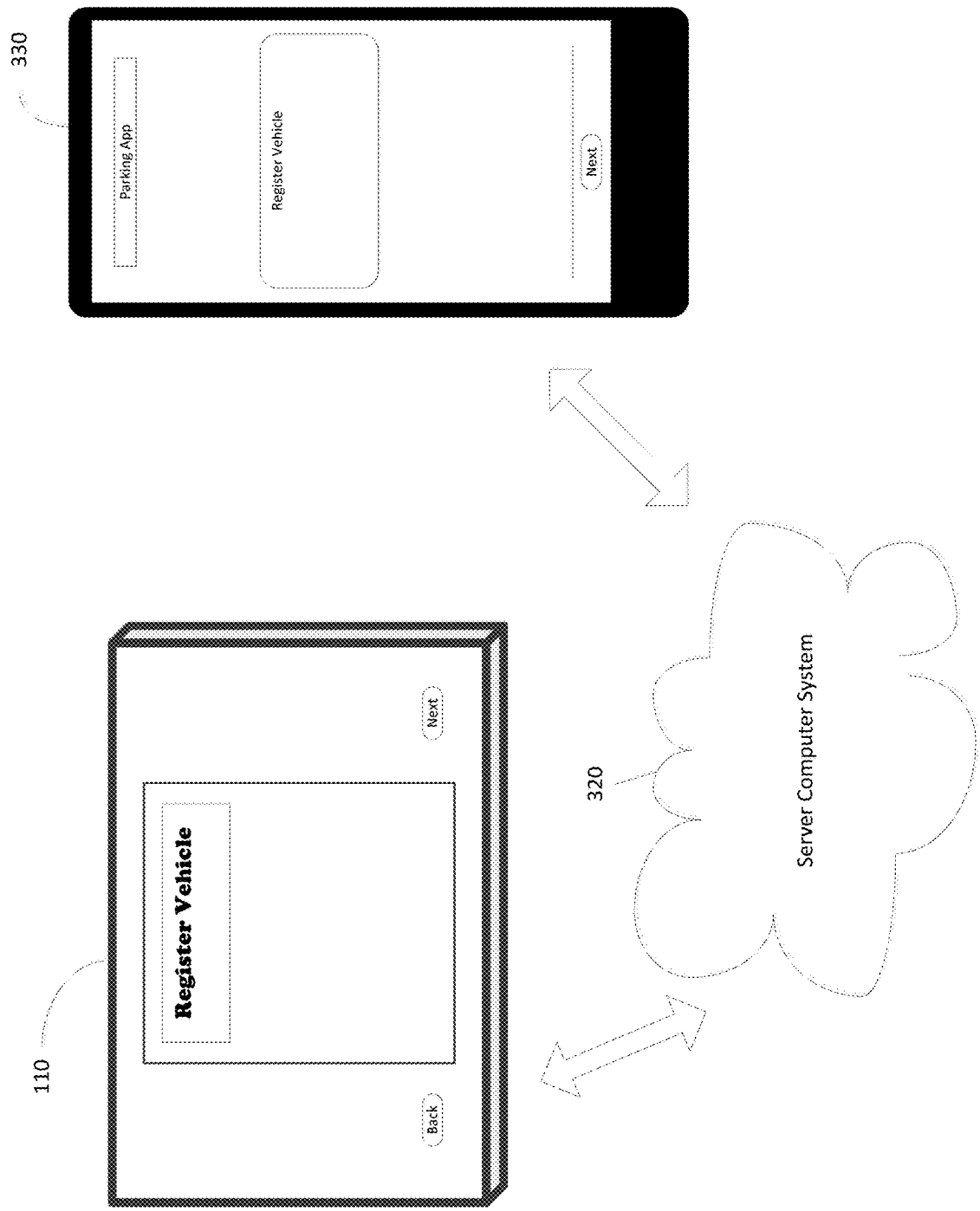
FIG. 3 is a system diagram according to an exemplary aspect of the disclosure.

FIG. 3 is a diagram of a system according to an exemplary aspect of the disclosure. The built-in display device 110 may be part of an in-vehicle computer system, or infotainment system. The infotainment system may be a computer-based system that includes communications circuitry for short range communications. Examples of short range communications may include WiFi®, Bluetooth®, a cellular network, direct transmission such as millimeter wave, ultrasonic, or laser. One or more of these communications circuitry may be used for external communication with a server computer system 320. The server computer system 320 may be the Internet, or some other network-based computer system.

Although the system of FIG. 3 includes a built-in display device 110, the system need not be limited to a built-in device. The device included in the vehicle may be a separate stand-alone device, such as a tablet computer or any display device having a wired or wireless communications interface.

A mobile device 330 may be provided with a mobile app that enables the mobile device 330 to perform some of the same functions as the built-in display 110. In an exemplary aspect, the mobile device 330 may be used as the display device in place of a built-in display device. In some embodiments, the vehicle is not equipped with a built-in display device 110, and the mobile device 330 is provided as the sole interactive display device for the vehicle. The mobile device 330 may be any of a number of types of mobile devices, including, but not limited to, a smartphone, a tablet, a laptop computer, or other computing device having a display and a means for interacting with the display, and a connection means to enable communications with the vehicle and/or with an external computer system. The means for interacting with the display may be a touchscreen or a pointing device.

In embodiments of the present disclosure, an app may be provided for the vehicle infotainment system, or a comparable app may be provided for a mobile device to offer parking-related services. In some embodiments, the mobile app may be used to access services without being connected to the vehicle, or being physically within the vehicle compartment, or proximate to the vehicle. In some embodiments, the mobile device is associated with more than one vehicle, and the mobile device may be used to select a particular vehicle in order to use the app for a particular vehicle. In some embodiments, either the mobile app or the built-in display may be used for parking-related services.

Figure 4:
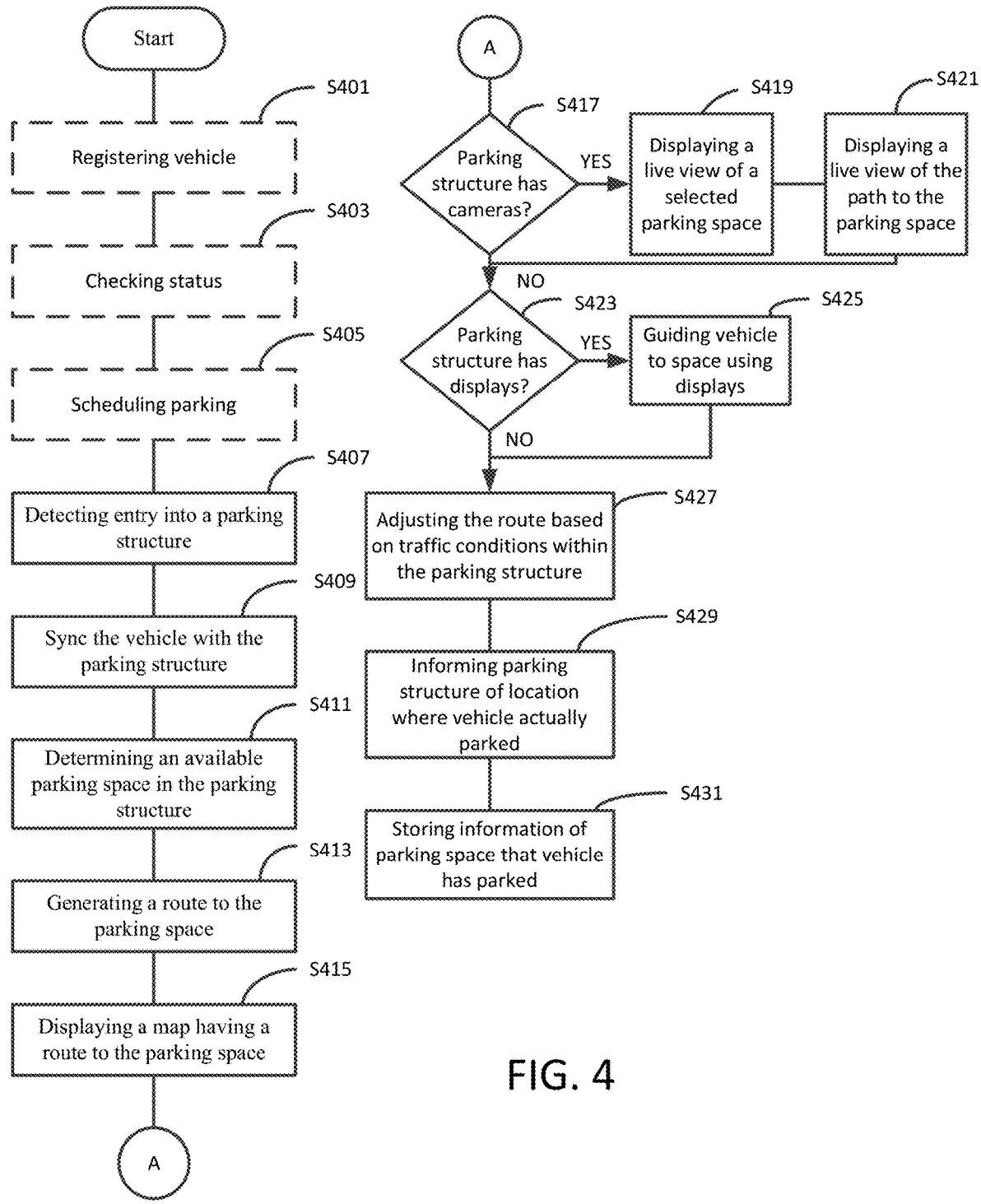
FIG. 4 is a flowchart for a car router system and parking scheduler according to an exemplary aspect of the disclosure.
Figure 5:
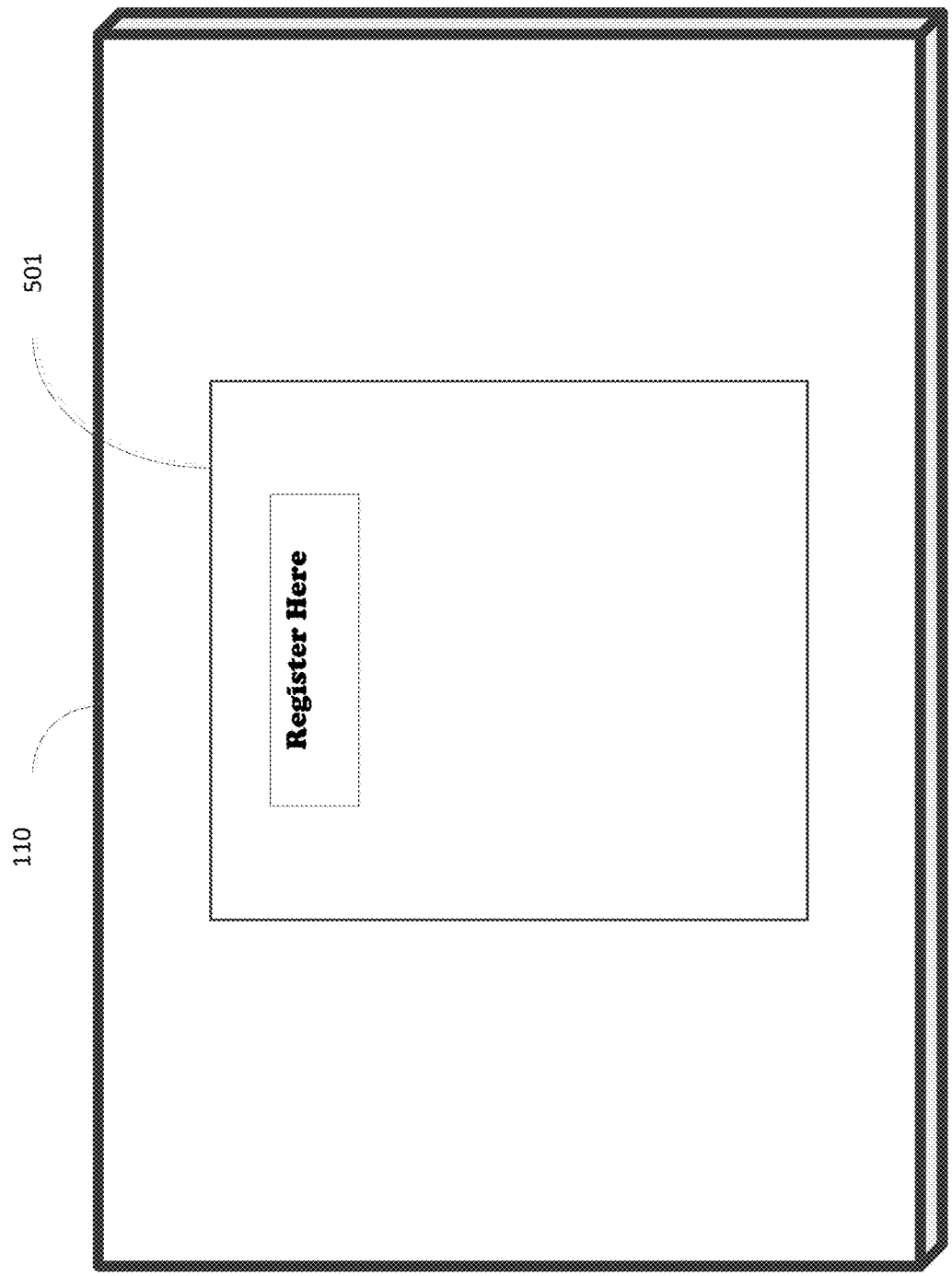
FIG. 5 is an example display according to an exemplary aspect of the disclosure.

FIG. 4 is a flowchart for a parking services method according to an exemplary aspect of the present disclosure. The method may be performed by processors within the vehicle, the mobile device 330, or a combination thereof. The steps S401, S403, S405 are steps that are not required for performance of other steps shown in the flowchart. Although steps in the flowchart are shown in a particular order, the order of steps may be altered in some cases. Also, some steps may be performed in parallel. In S401, initially it may be required to register a vehicle in order to carry out functions such as checking status of parking, scheduling parking, or obtaining parking status at a particular date and time. In another exemplary aspect, a vehicle may be automatically identified by way of its license plate number or some other feature as it enters a parking structure. As shown in FIG. 5, a start screen 501 may be displayed in the built-in display device 110 of the vehicle in order to begin registration of a vehicle.

Figure 6:
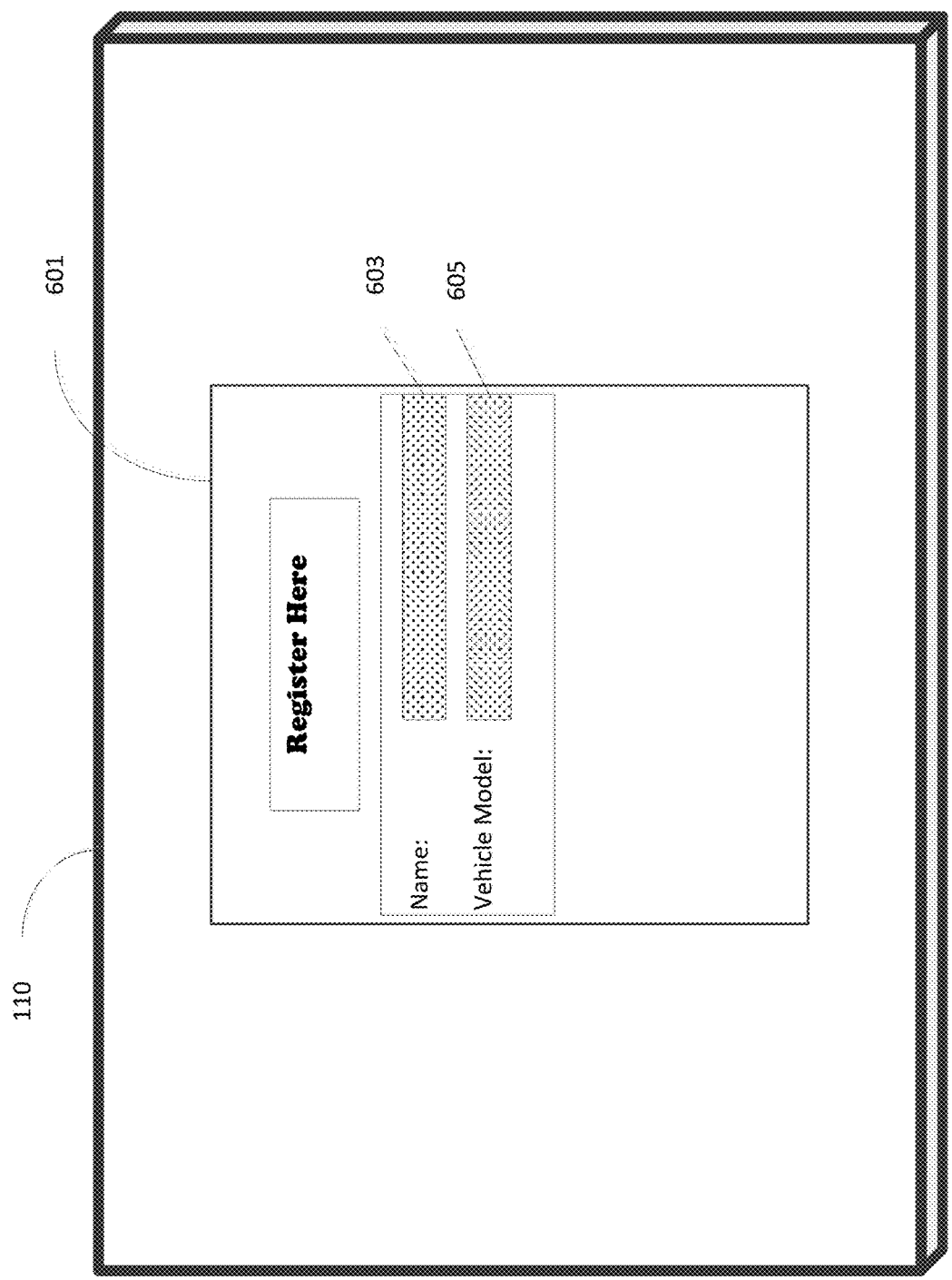
FIG. 6 is an example display according to an exemplary aspect of the disclosure.

As shown in FIG. 6, a registration start screen 601 may provide input slots for a register's name 603 and vehicle information 605, such as vehicle make, model, and color, which may be needed to identify the vehicle in a parking structure. In an exemplary aspect, initial access for registration may require setting up an account with a username and password.

Figure 7:
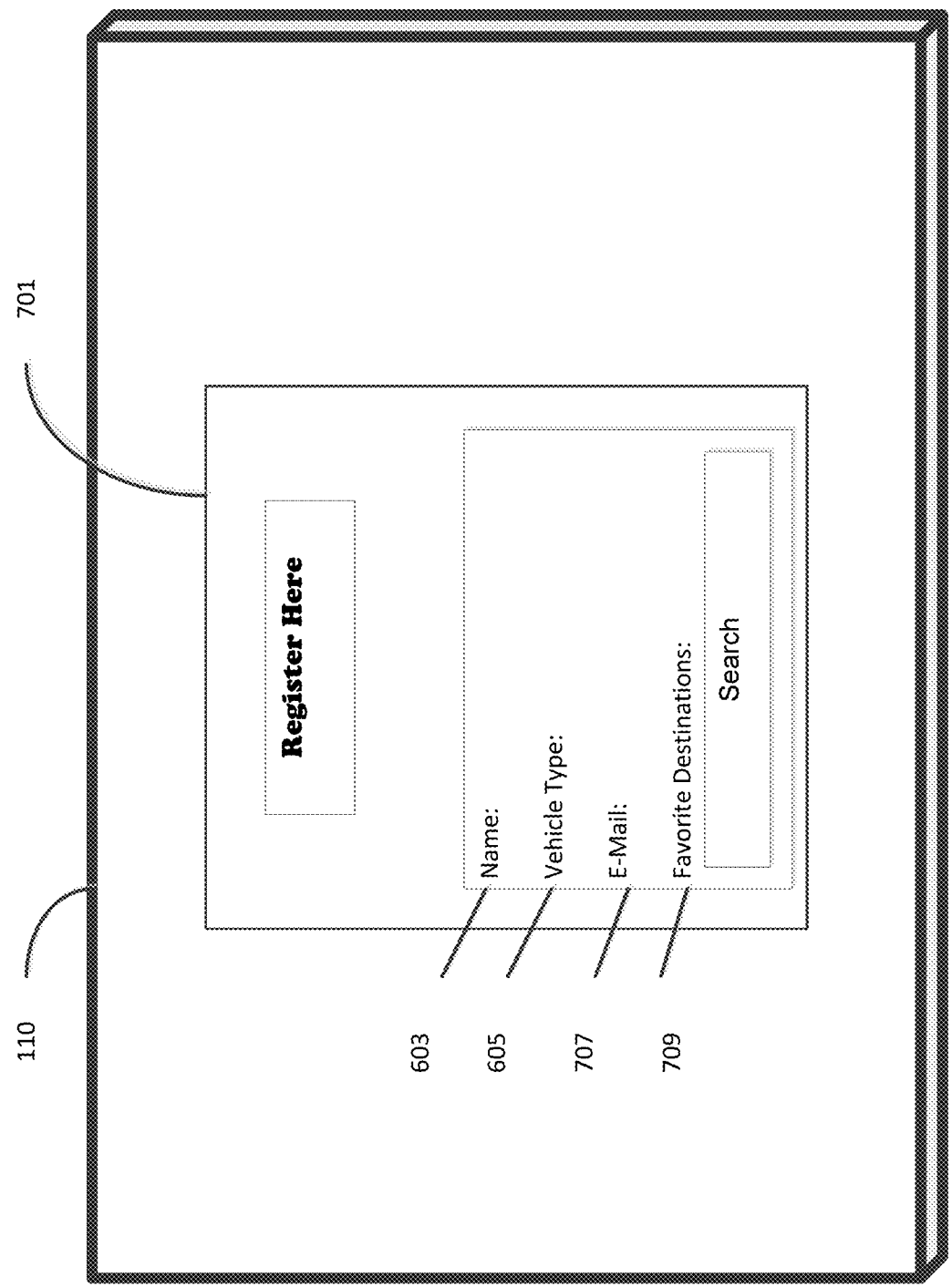
FIG. 7 is an example display according to an exemplary aspect of the disclosure.

As shown in FIG. 7, a registration screen may provide input slots so that specific feedback may be sent to a registered user. Such input information may include contact information, such as e-mail address 707, phone number, and favorite destination locations 709, such as restaurants, shops, and entertainment venues.

Figure 10:
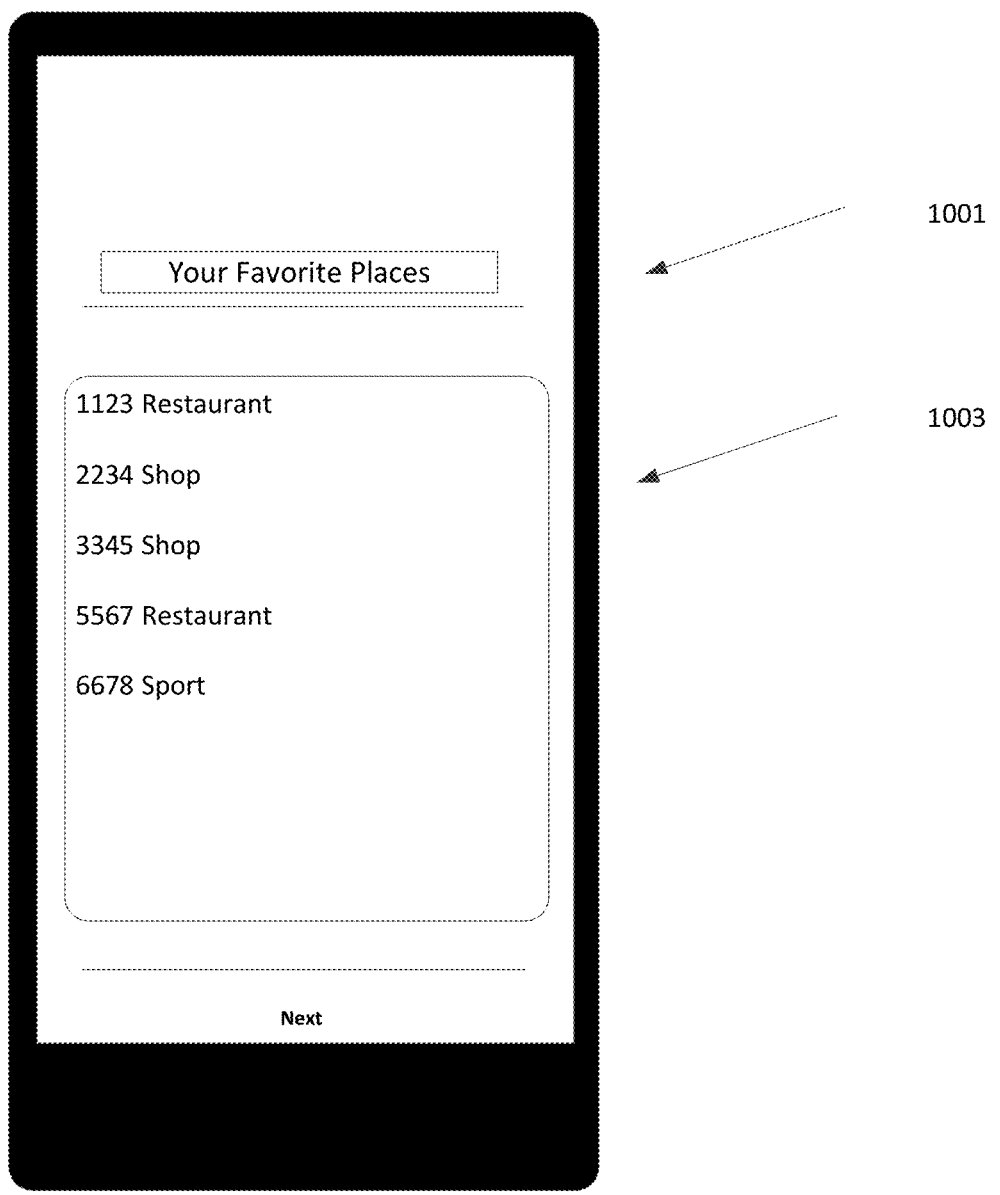
FIG. 10 is an example display on a mobile device according to an exemplary aspect of the disclosure.

In S403, a person may wish to check the status of parking at a particular parking structure or the status of parking in the vicinity of a destination location. In a parking structure, such as the multi-level parking structure of FIG. 2, or any other parking structure having identified parking spaces and one or more paths to the spaces, information on the number of available parking spaces may be made available to registered users remotely from the parking structure. FIG. 8 is a flowchart for the step S403 of checking status of parking in a vicinity of a destination location. FIG. 9 is a flowchart for a function of checking status of parking, where status information may be provided to a registered user via the e-mail address or other contact information entered during registration. In the case of checking the status of parking in the vicinity of a destination location, in S801, as shown in FIG. 10, a screen 1001 may be displayed for previously entered favorite destinations. The user may select a destination location from a list of previously entered favorite destinations 1003. In an exemplary aspect, previously entered destinations may be categorized and displayed by category. For example, favorite destinations may be categorized as restaurants, shops, and entertainment venues.

Figure 11:
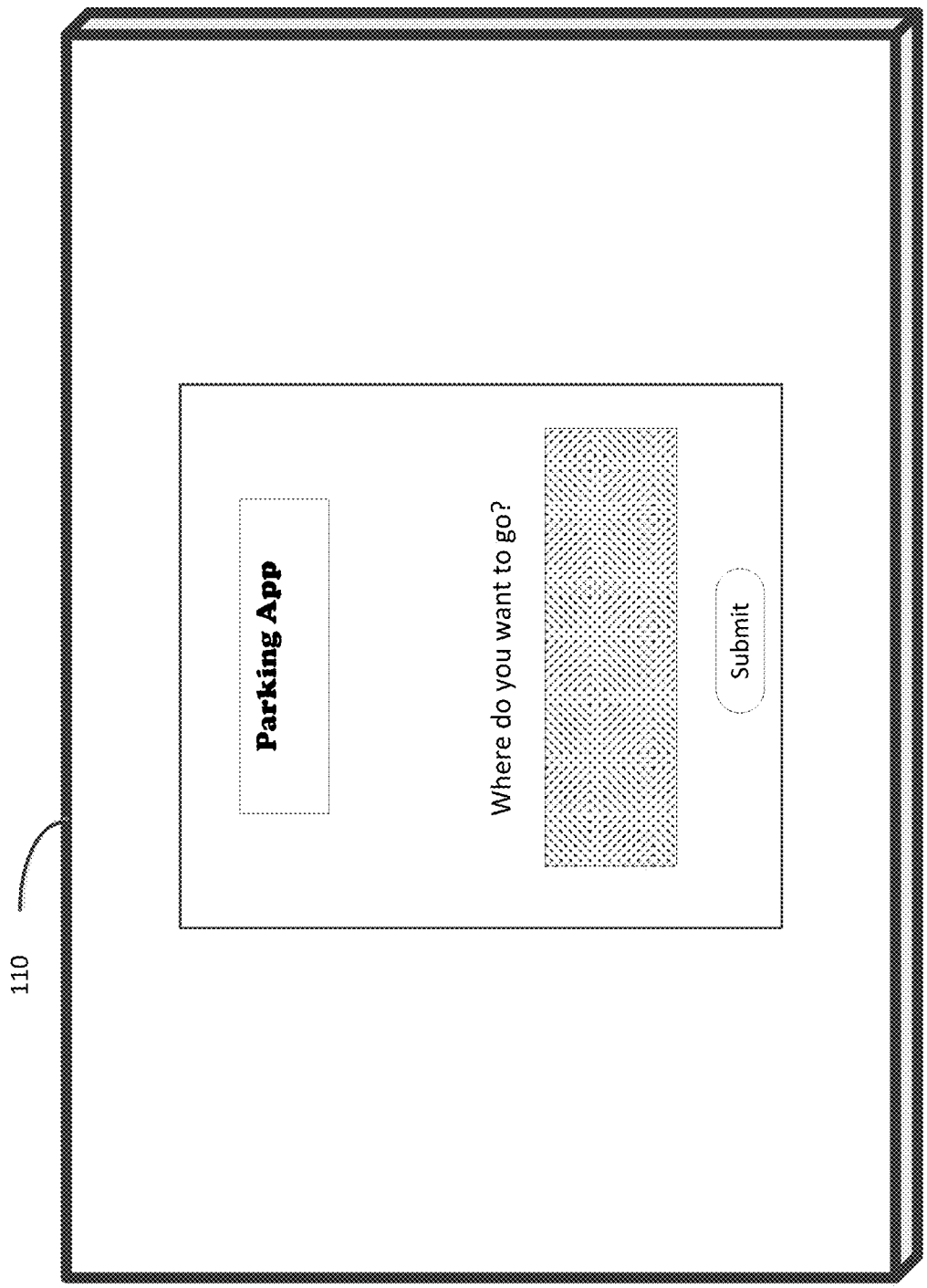
FIG. 11 is an example display for a smart display device according to an exemplary aspect of the disclosure.
Figure 12:
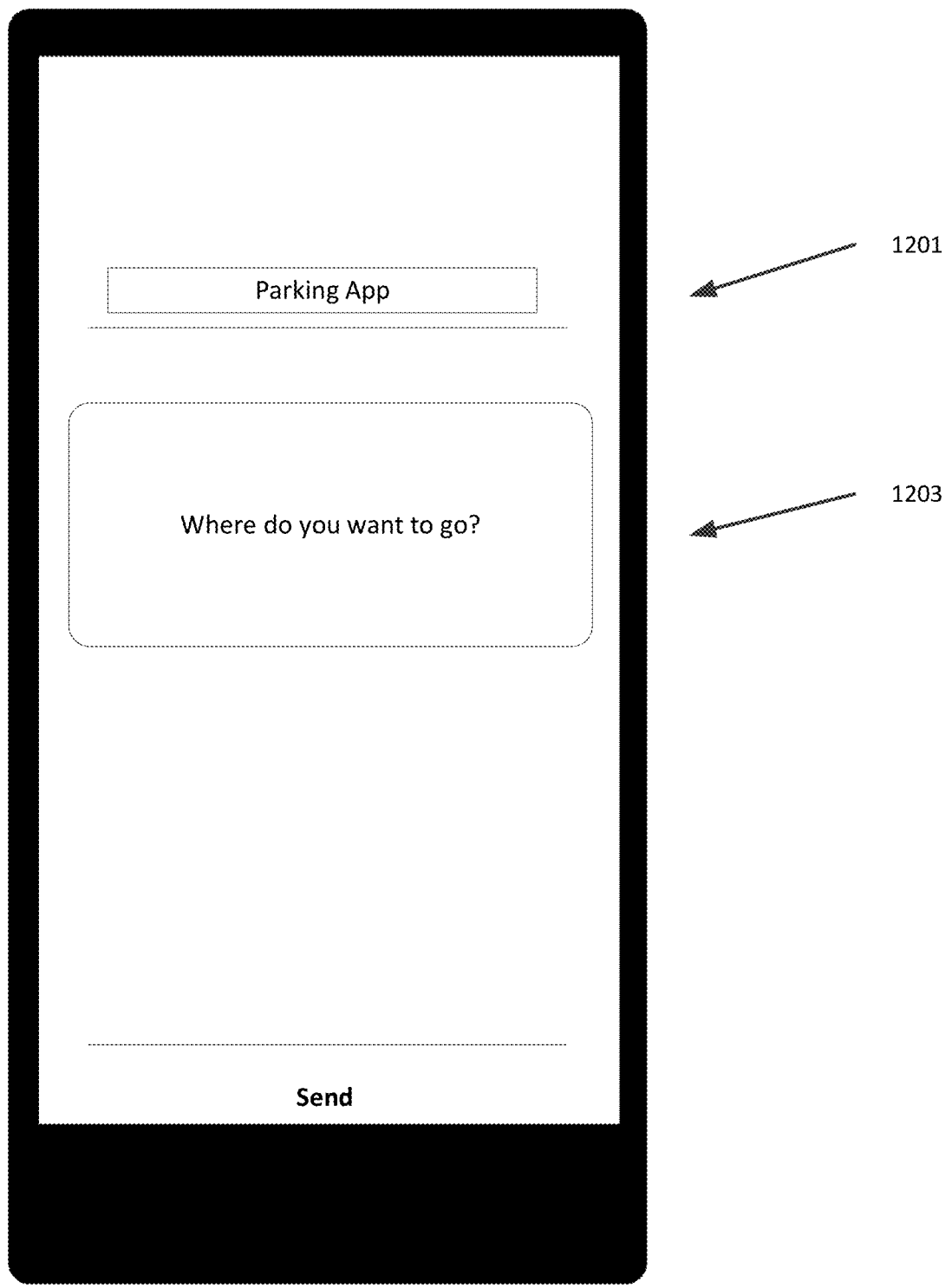
FIG. 12 is an example display on a mobile device according to an exemplary aspect of the disclosure.

In an alternative exemplary aspect, as shown in FIG. 11, the user may enter and submit a new destination to obtain parking status information for nearby parking while in a vehicle using built-in display device 110. In another exemplary aspect, as shown in FIG. 12, the registered user may use an app 1201 to enter and submit a new destination 1203 to have parking status information sent to a user based on previously entered contact information.

In S803, one or more parking structures nearby the destination location may be identified.

Figure 13:
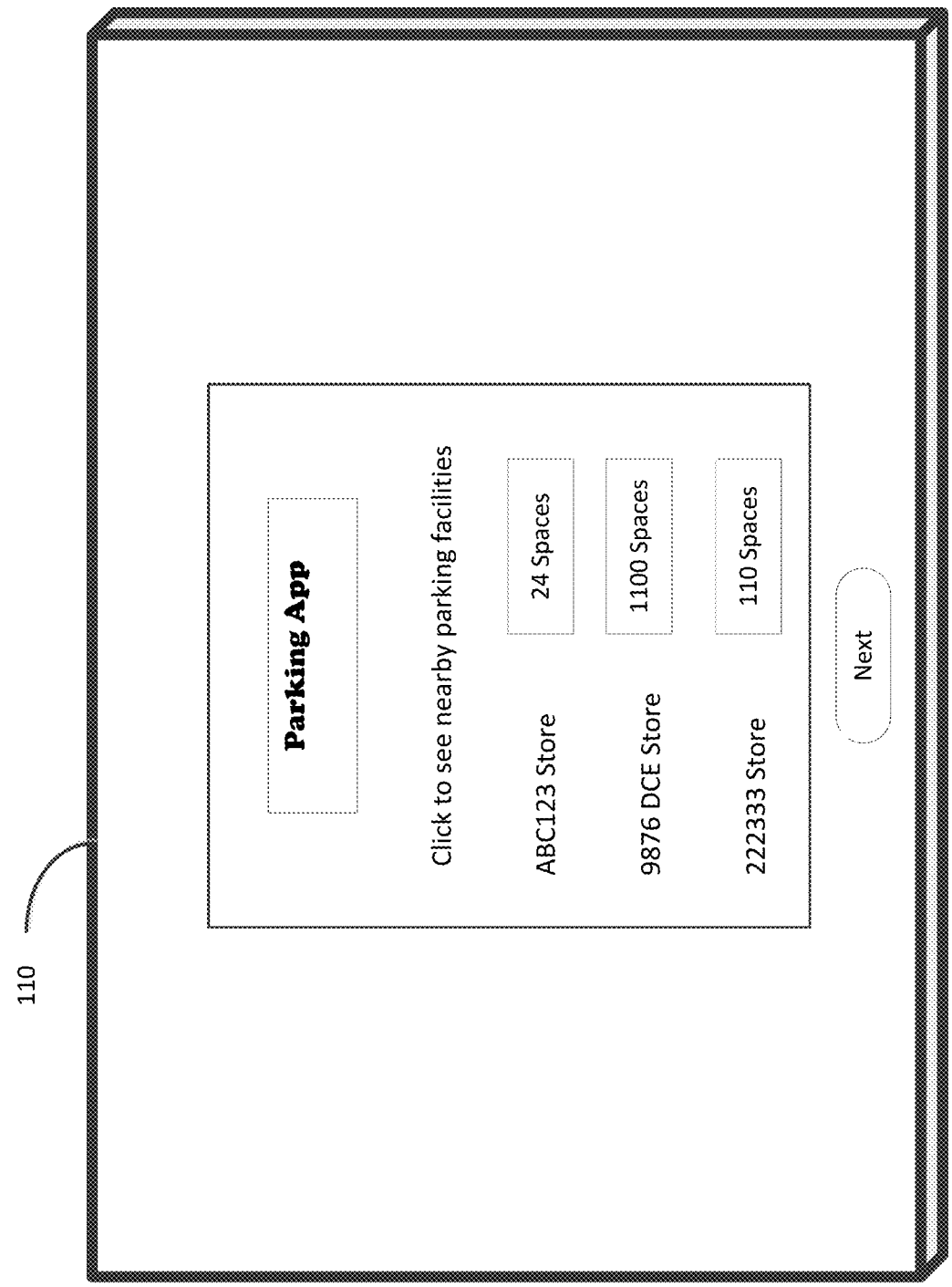
FIG. 13 is an example display for a smart display device according to an exemplary aspect of the disclosure.

In S901, a user may input a vehicle and favorite destinations for purposes of obtaining periodic information on parking space availability for parking structures proximate to the favorite destinations. Subsequently, without performing a search, the user may be readily informed of parking status information and may make a decision as to whether it is a good time to visit a favorite destination. In an exemplary aspect, as shown in FIG. 13, the full list of favorite destinations, or a list of selected favorite destinations may be used to, in step S903, periodically send status information on parking in the vicinity of each destination.

In an exemplary aspect, the status of parking spaces nearby a destination location may be constrained. For example, the screen for entering a new destination location of FIG. 11, or FIG. 12, may include an option to enter a constraint that only parking structures free of charge should be reported for status information. In another example, the screen of FIG. 11, or FIG. 12, may include an option to report status information of parking structures having charging stations for charging electric vehicles, and to monitor only parking spaces having charging stations.

Figure 14:
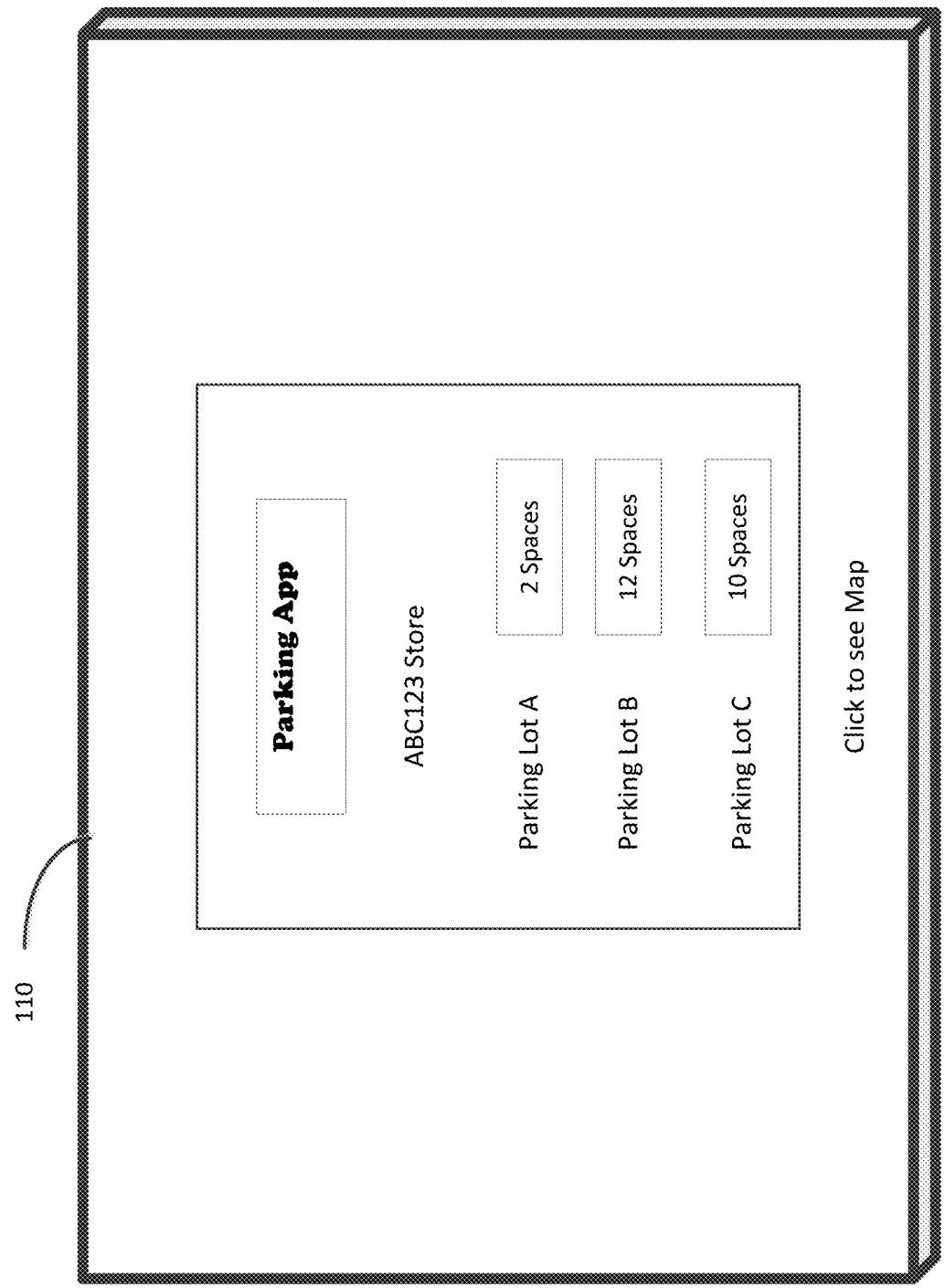
FIG. 14 is an example display for a smart display device according to an exemplary aspect of the disclosure.
Figure 15:
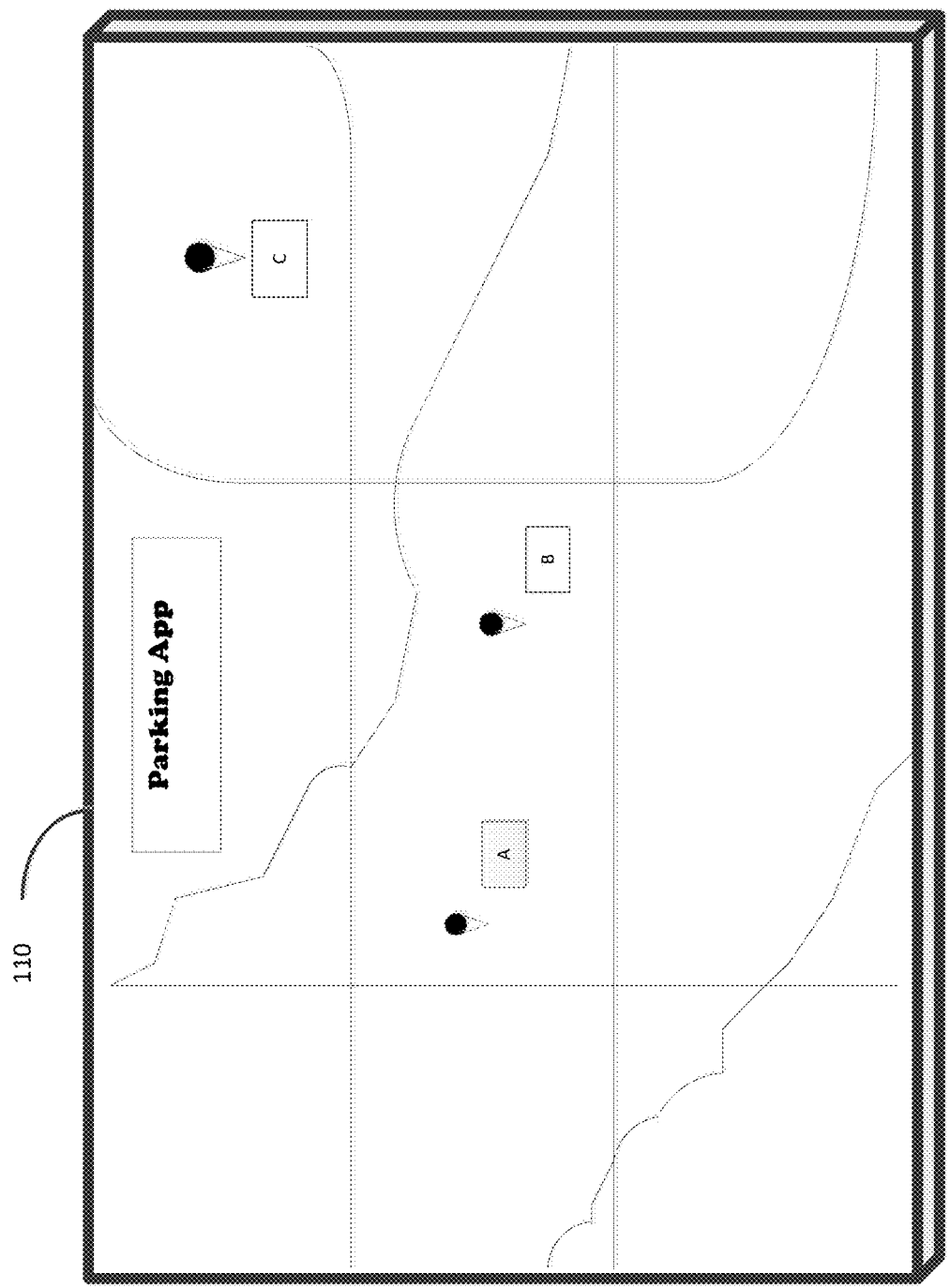
FIG. 15 is an example display for a smart display device according to an exemplary aspect of the disclosure.

Referring back to FIG. 8, in S805, status information of the one or more parking structures near the destination location may be displayed. FIG. 14 illustrates a screen that can be displayed to show parking status information for a list of parking structures for a selected destination. FIG. 15 illustrates a map view of the list of parking structures of FIG. 14. In an exemplary aspect, the list of parking structures of FIG. 14 may be displayed in the same display as the map of FIG. 15, for example as a sub-screen.

Figure 16:
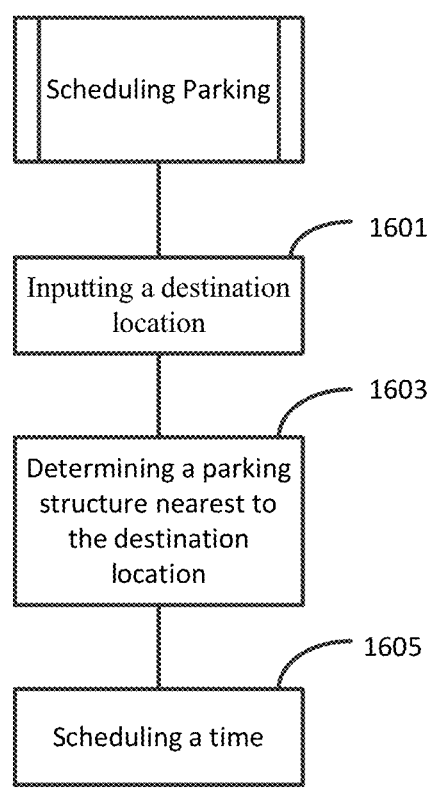
FIG. 16 is a flowchart for a step of scheduling parking according to an exemplary aspect of the disclosure.
Figure 17:
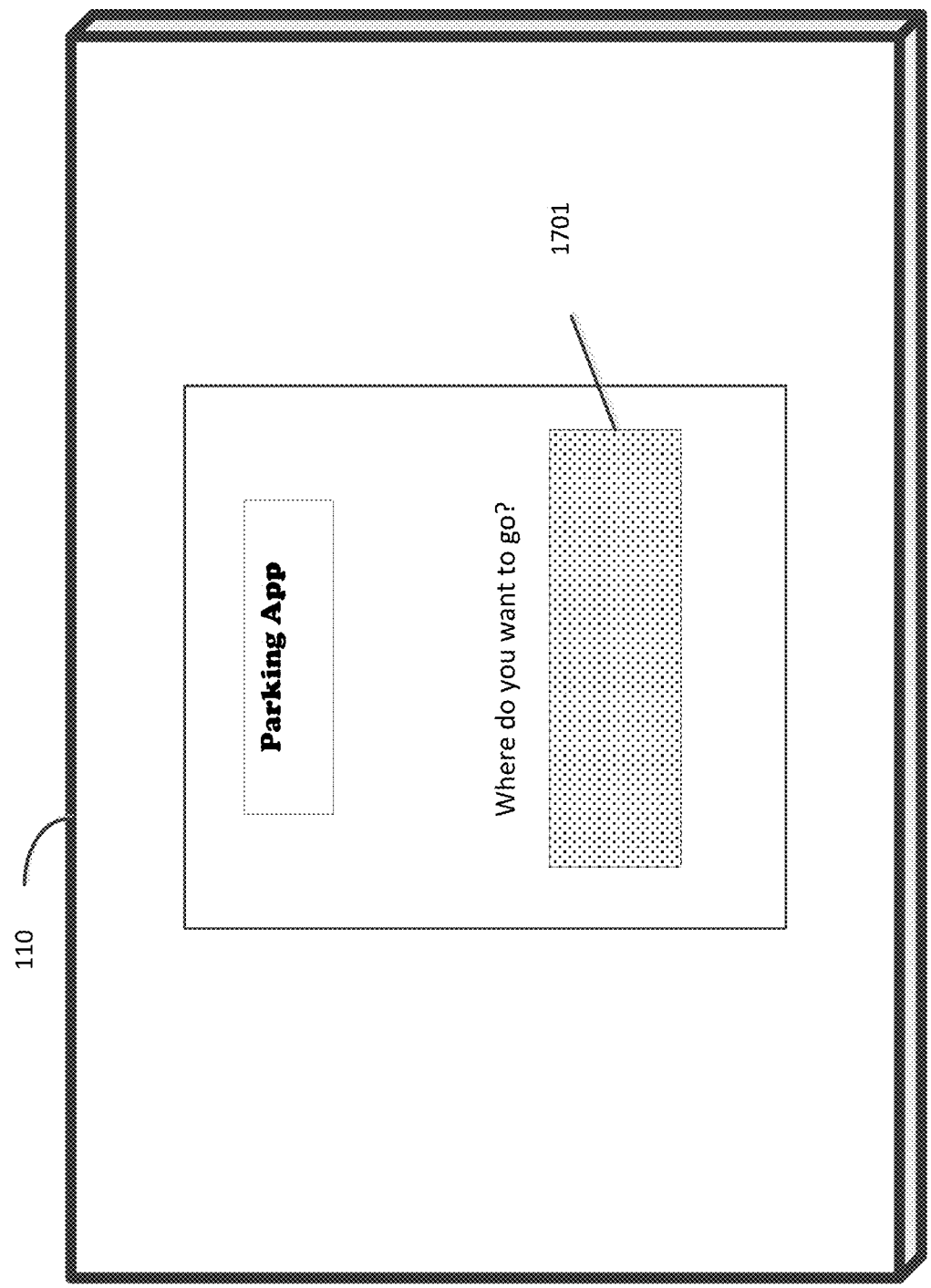
FIG. 17 is an example display for a smart display device according to an exemplary aspect of the disclosure.
Figure 18:
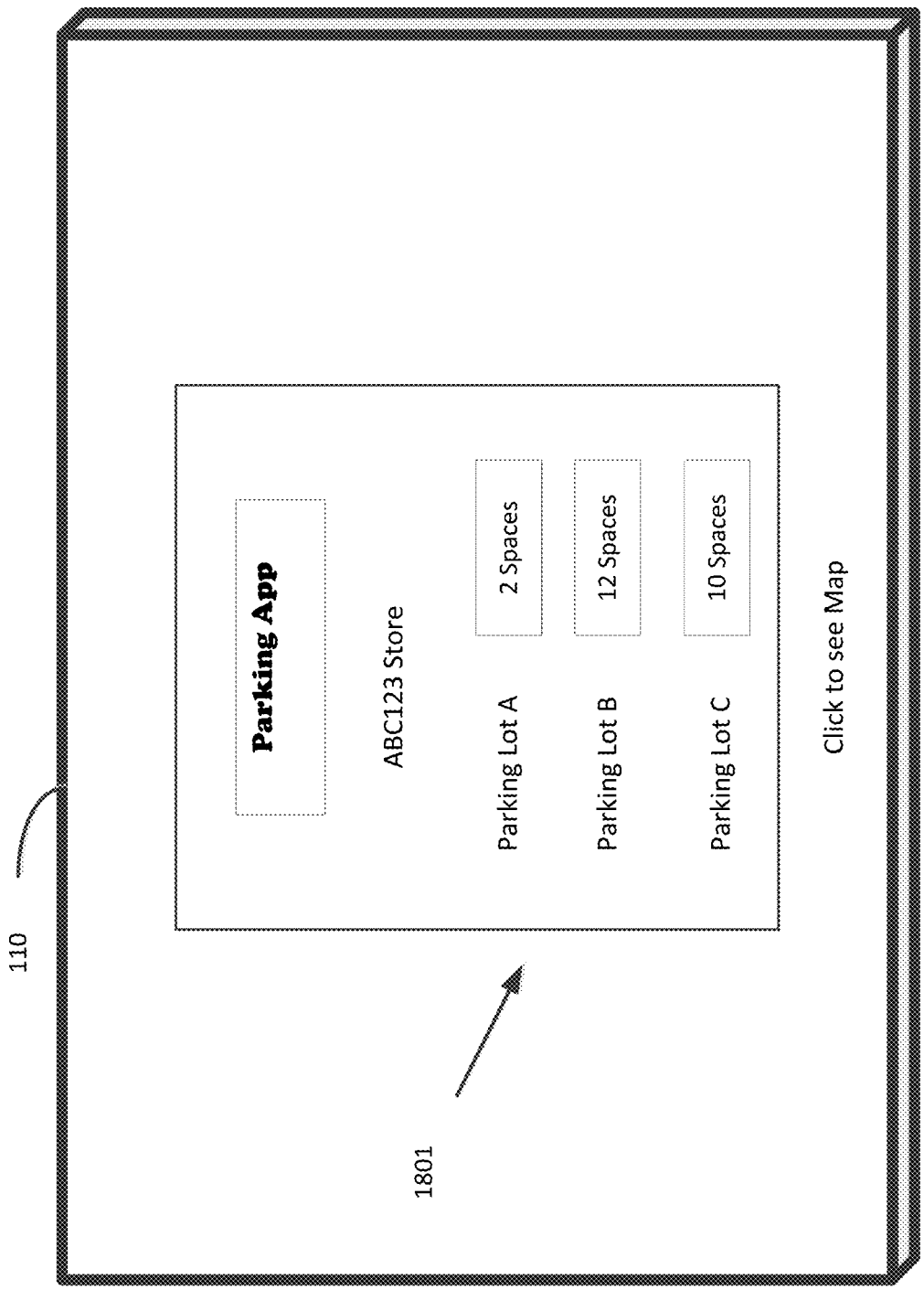
FIG. 18 is an example display for a smart display device according to an exemplary aspect of the disclosure.
Figure 19:
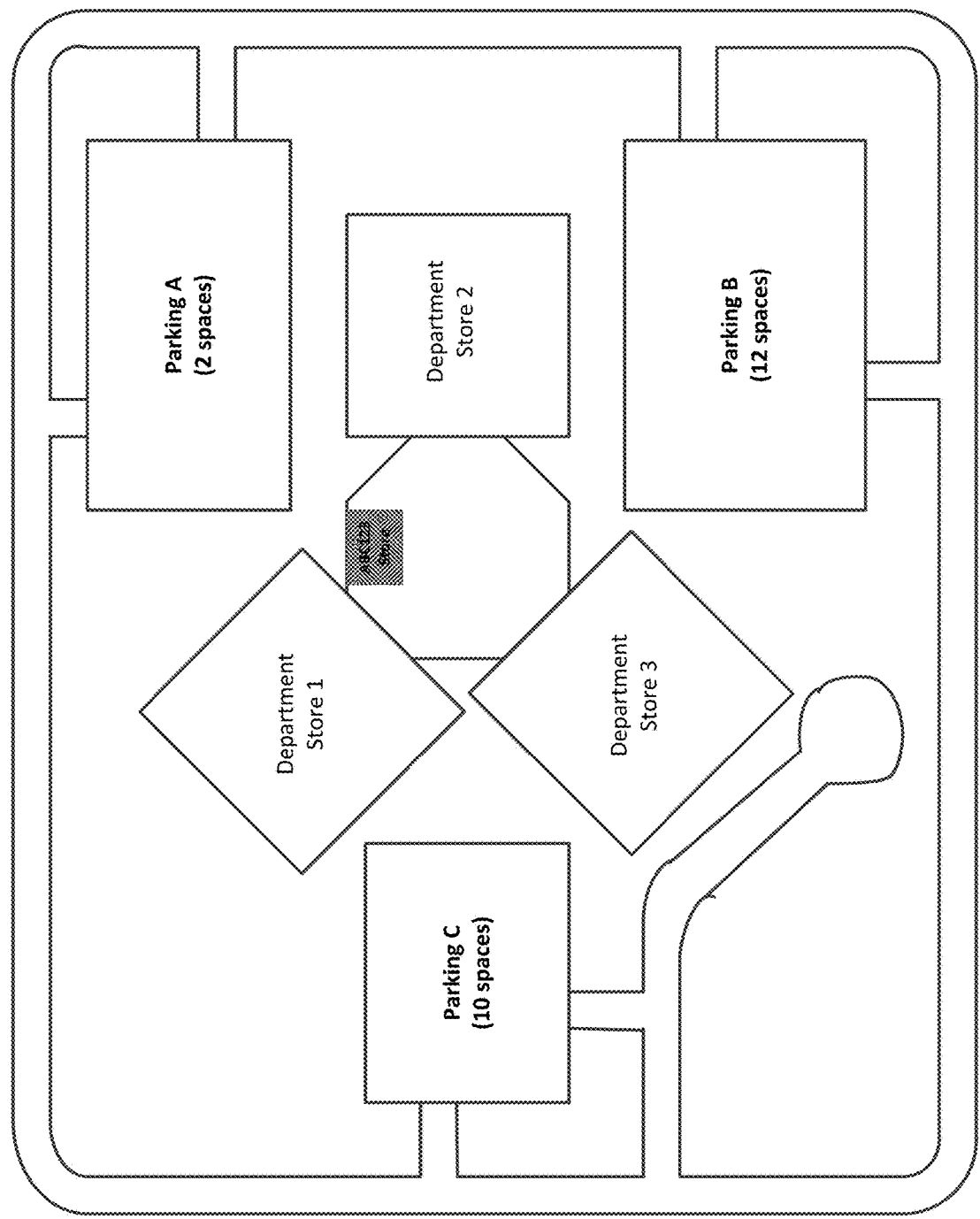
FIG. 19 is an example layout of parking structures in the vicinity of a shopping center according to an exemplary aspect of the disclosure.
Figure 20:
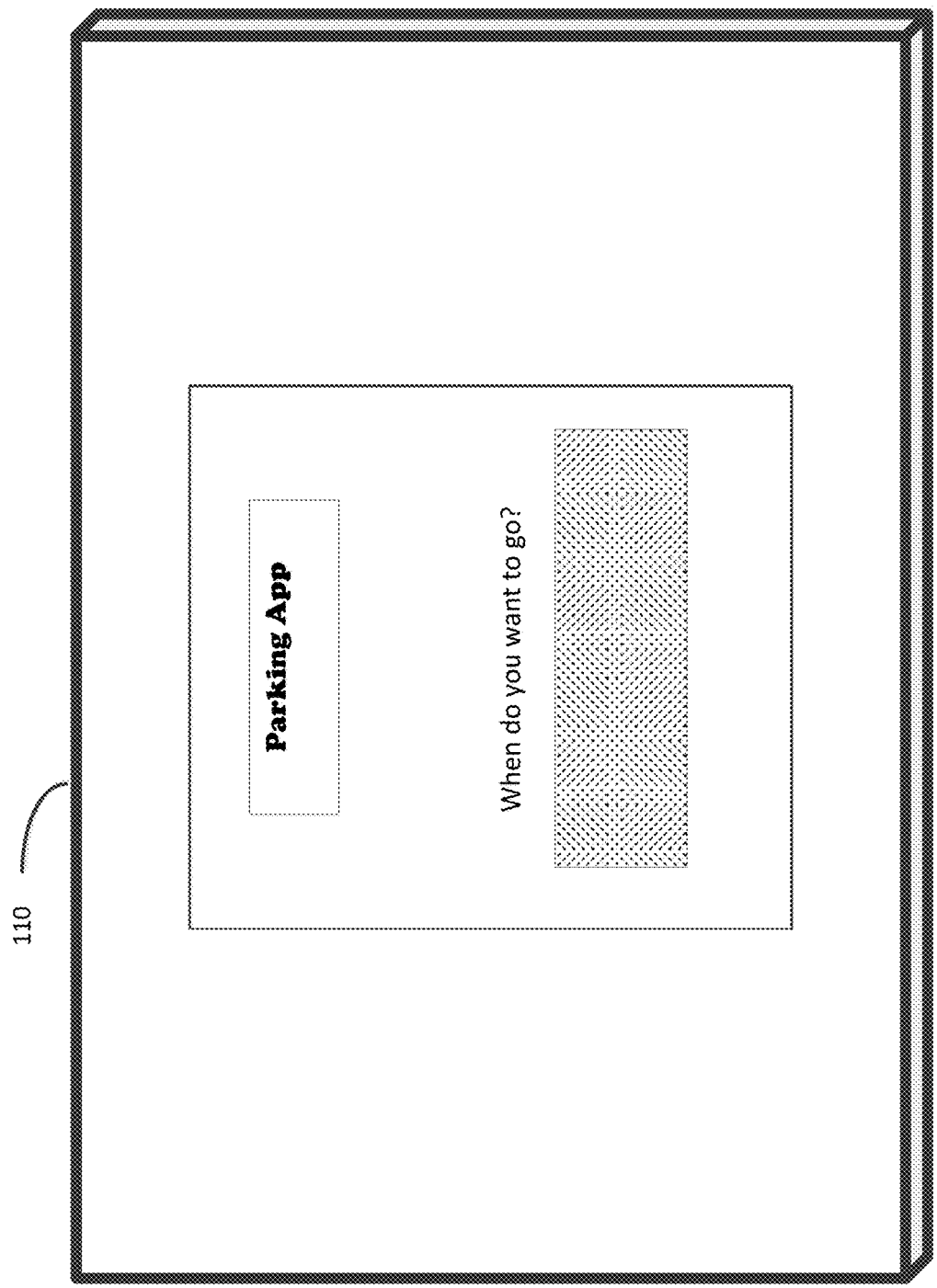
FIG. 20 is an example display for a smart display device according to an exemplary aspect of the disclosure.

Referring back to FIG. 4, in S405, a person may wish to determine an appropriate time to go to a destination location based on historical parking information for a parking structure. In an exemplary aspect, in S1601 of FIG. 16, a person may input a destination location, for example by entering a destination location in slot 1701 of the screen in FIG. 17. In S1603, one or more parking structures nearest to the destination location may be determined. As shown in FIG. 18, the status of one or more parking structures may be displayed in a list 1801. A user may be presented with an option to display a map showing the one or more parking structures, for example, Parking A, Parking B, Parking C as shown in FIG. 19. Referring back to FIG. 16, in S1605, the person may input a time that they would like to go to the destination location, for example as shown in FIG. 20. In response, the person may be provided with a display that shows the estimated status information of the parking structure at the scheduled time.

Figure 21:
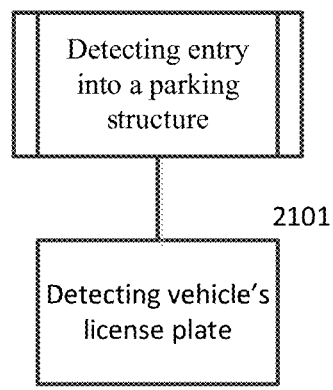
FIG. 21 is a flowchart for a step of detecting entry into a parking structure according to an exemplary aspect of the disclosure.
Figure 22:
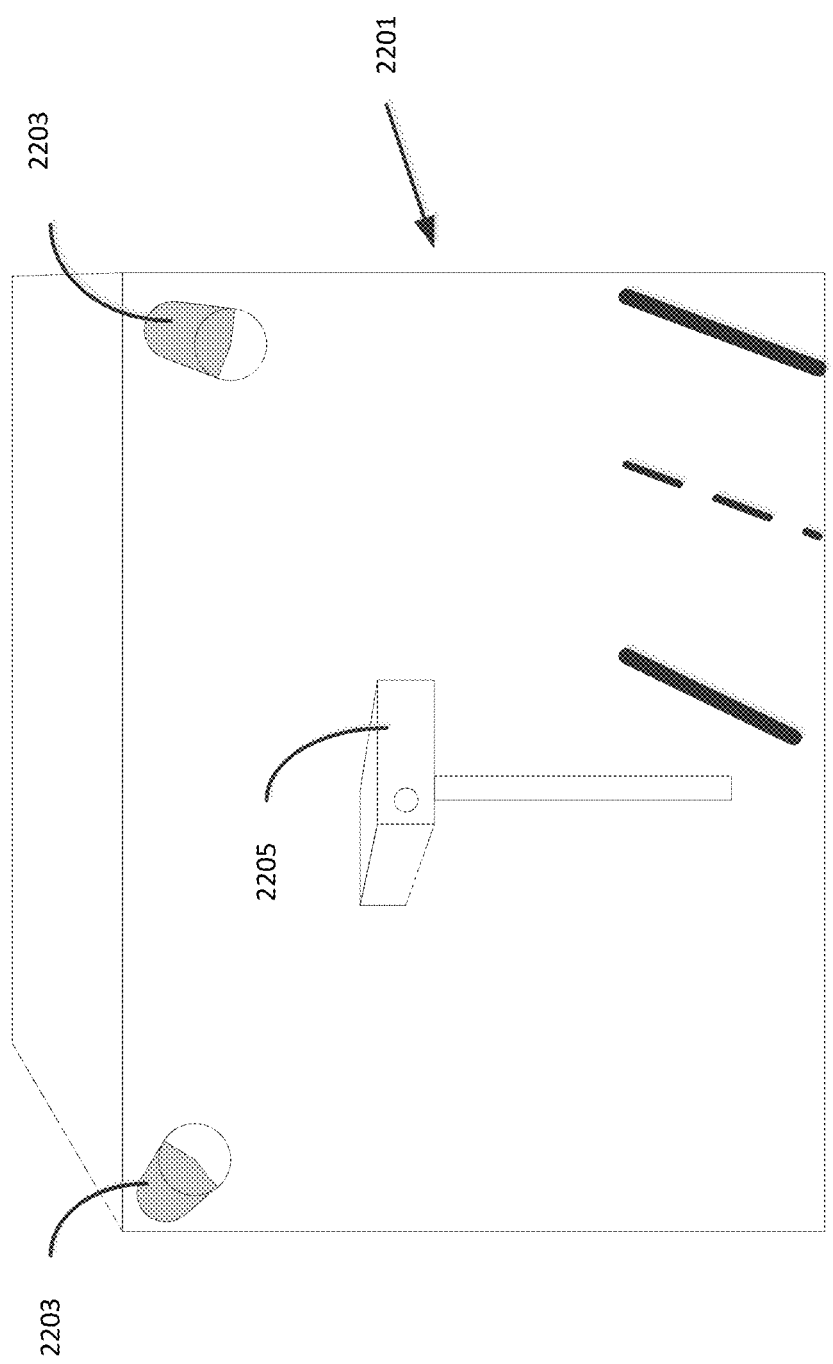
FIG. 22 is a schematic diagram showing an example entrance to a parking structure according to an exemplary aspect of the disclosure.

In one embodiment, a vehicle may communicate with a parking structure so that the vehicle may efficiently locate and park in a particular parking space. The embodiment may determine a particular parking space and may determine a route to the parking space within the parking structure. The embodiment may utilize the sensor system in a parking structure that monitors available parking spaces. In addition, referring back to FIG. 4, in S407 the embodiment may detect entry into a parking structure. In an exemplary aspect, in S2101 of FIG. 21 the embodiment may detect entry by detecting a vehicle's license plate. The vehicle's license plate may be input at the time that the driver registers a vehicle. As shown in FIG. 22, the license plate may be recognized by a camera 2203 located around the entrance 2201 to the parking structure. The camera 2203 may be a low resolution camera that is sufficient to take a photograph of a recognizable license plate number. In an exemplary aspect, the entrance to the parking structure may include an input/output device 2205, which may be used for the driver to provide an input, such as pressing a button, in order to indicate that a vehicle is to enter the parking structure. In S409, as the vehicle is detected at the entrance to the parking structure the vehicle may be synchronized with the parking structure. In an exemplary aspect, the vehicle may establish communication with the parking structure via a local wireless communication system such as WiFi®. Several cameras 2203 may be located near the entrance 2201. A camera 2203 that is positioned facing the vehicle's license plate may be used to capture an image of the license plate. The vehicle's license plate may be used to pair the vehicle with a parking space.

Referring back to FIG. 4, in S411, the embodiment may determine an available parking space in the parking structure. An exemplary aspect is determining an available parking space using an interactive map. An exemplary aspect may determine an available parking space by providing a list of prioritized parking spaces. An exemplary aspect is determining an available parking space based on a feature of the vehicle.

Figure 23:
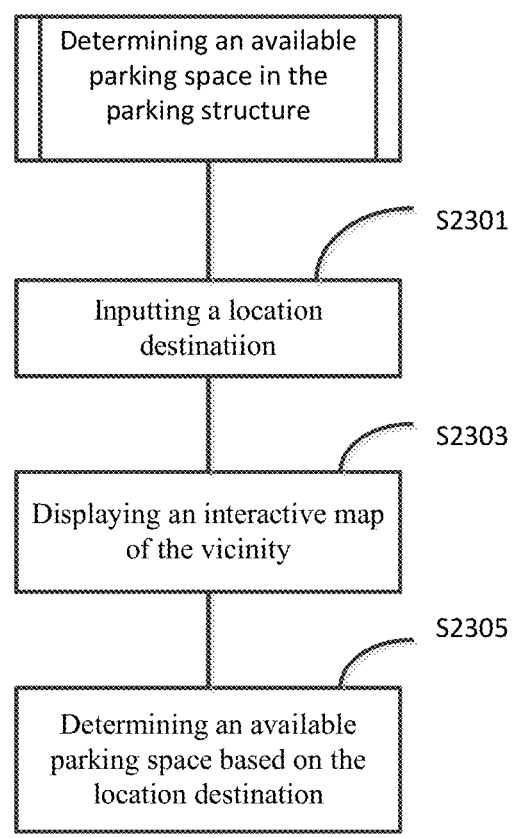
FIG. 23 is a flowchart for a step of determining an available parking space in the parking structure according to an exemplary aspect of the disclosure.
Figure 24:
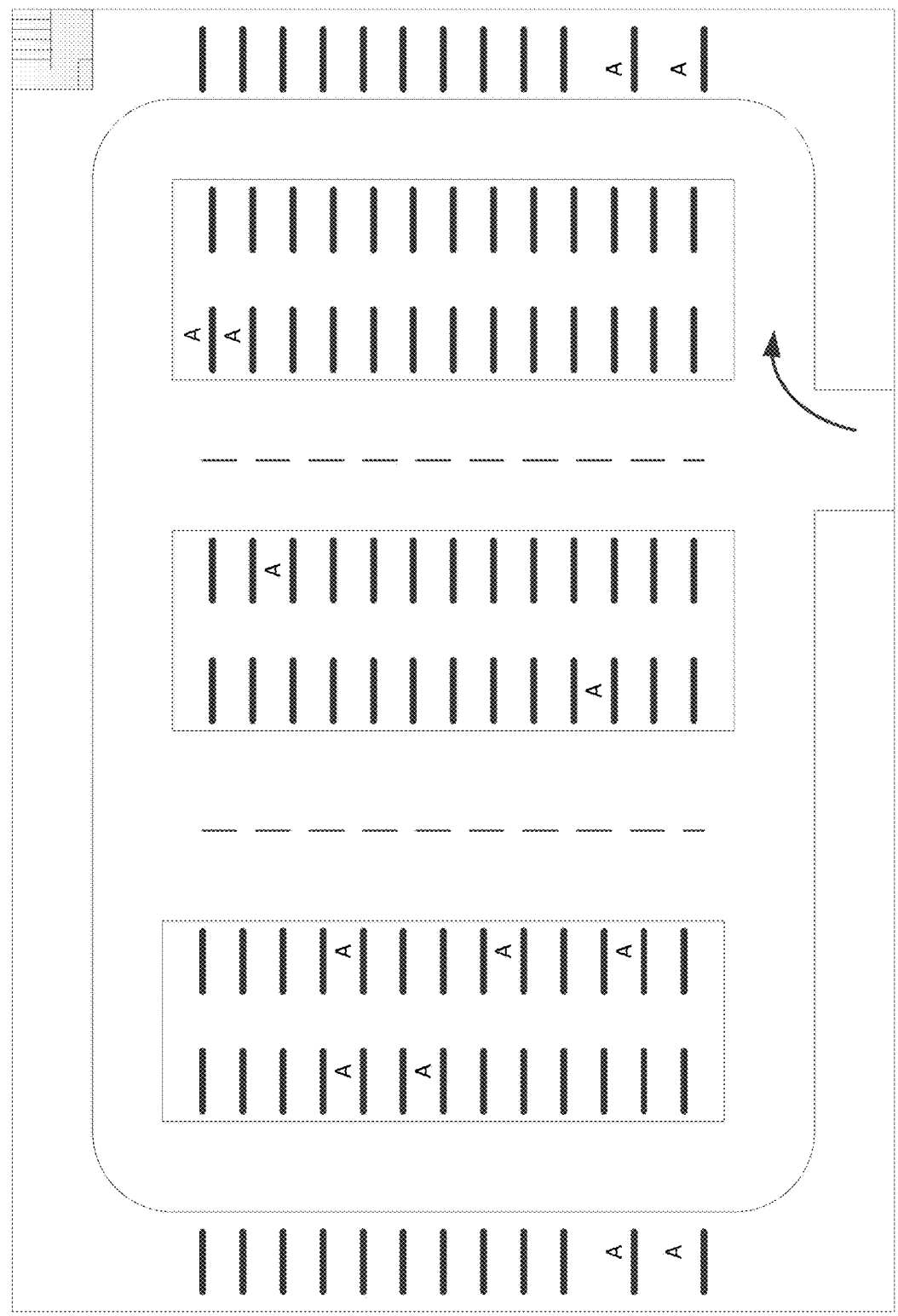
FIG. 24 is a diagram showing parking spaces in a level of a multilevel parking structure according to an exemplary aspect of the disclosure.

FIG. 23 is a flowchart for a case where an available parking space may be selected using an interactive map of the parking structure. In S2301, at the entrance to the parking structure, the driver may input a location destination. In S2303, an interactive map of the parking structure in the vicinity of the location destination. In some aspects, the location destination may be input using the interactive map. In S2305, the embodiment may determine an available parking space and display the selected parking space. FIG. 24 is a display for the smart display according to an exemplary aspect of the disclosure. FIG. 24 illustrates an example interactive map of the parking structure. The interactive map may show an overview of available parking spaces on one or more levels of a multi-level parking structure.

Figure 25:
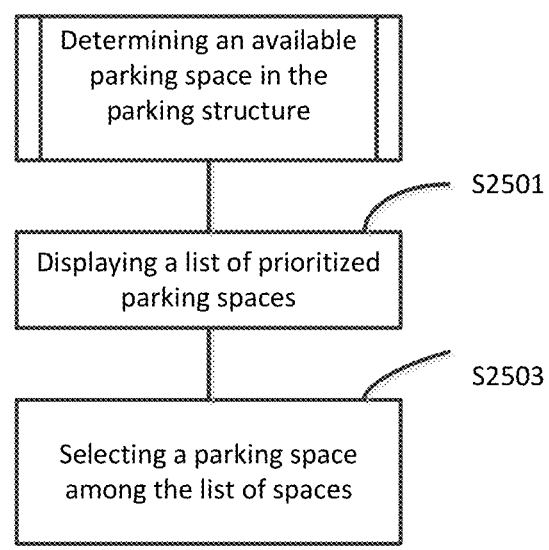
FIG. 25 is a flowchart for a step of determining an available parking space in the parking structure according to an exemplary aspect of the disclosure.

FIG. 25 is a flowchart for a case where available parking spaces are presented in a list of prioritized parking spaces. In S2501, while the vehicle is at the entrance to the parking structure, the embodiment may display a list of prioritized parking spaces, and in S2503, the driver may quickly select a parking space from among the list of parking spaces.

Figure 26:
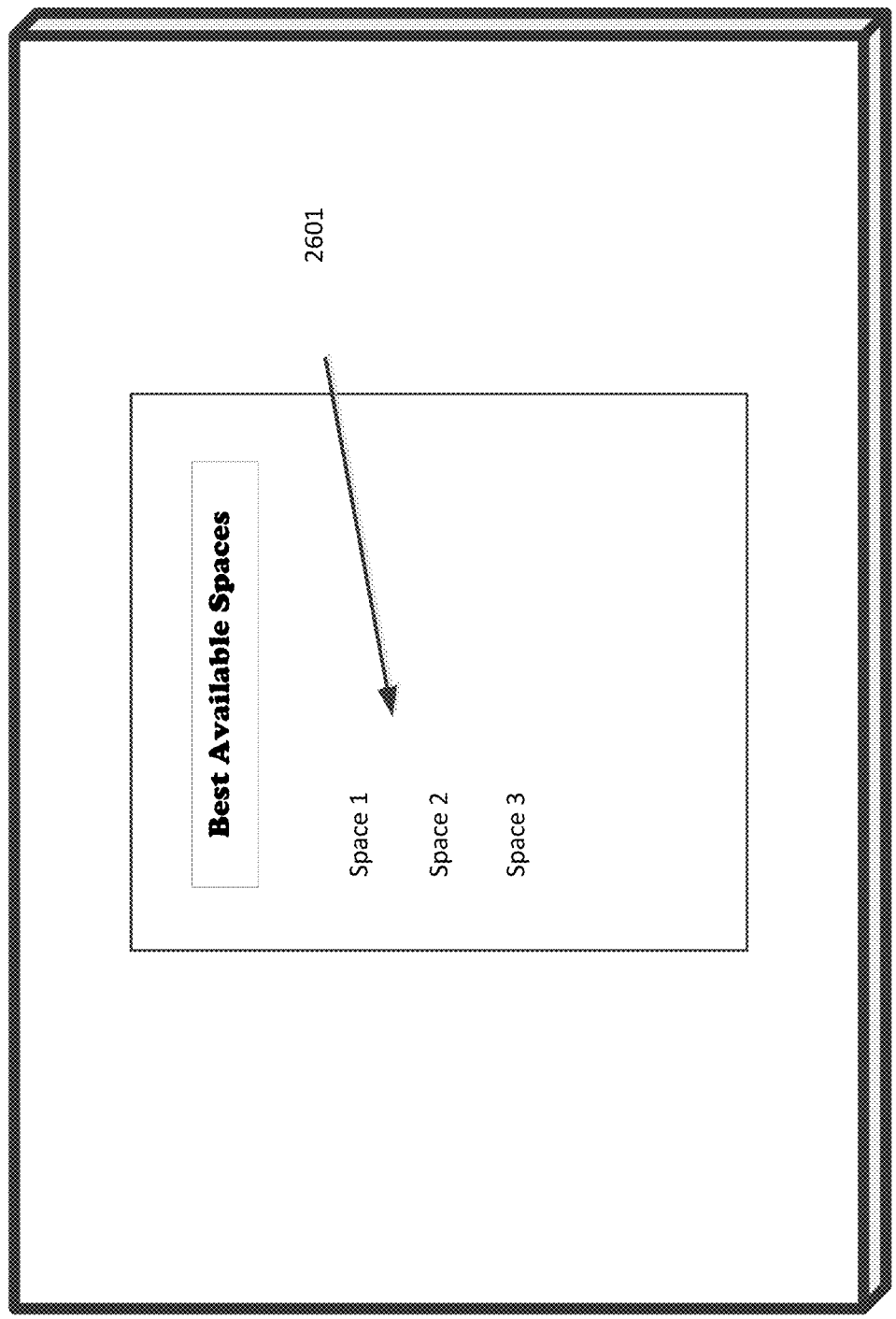
FIG. 26 is an example display for a smart display device according to an exemplary aspect of the disclosure.

FIG. 26 illustrates a flowchart for a case where available parking spaces are presented as a list of prioritized parking spaces.

Figure 27:
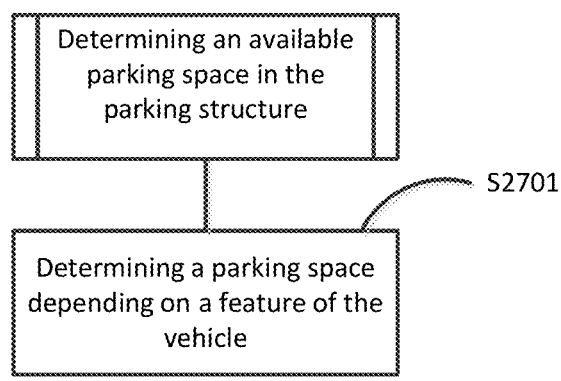
FIG. 27 is a flowchart for a step of determining available parking space in the parking structure according to an exemplary aspect of the disclosure.
Figure 28:
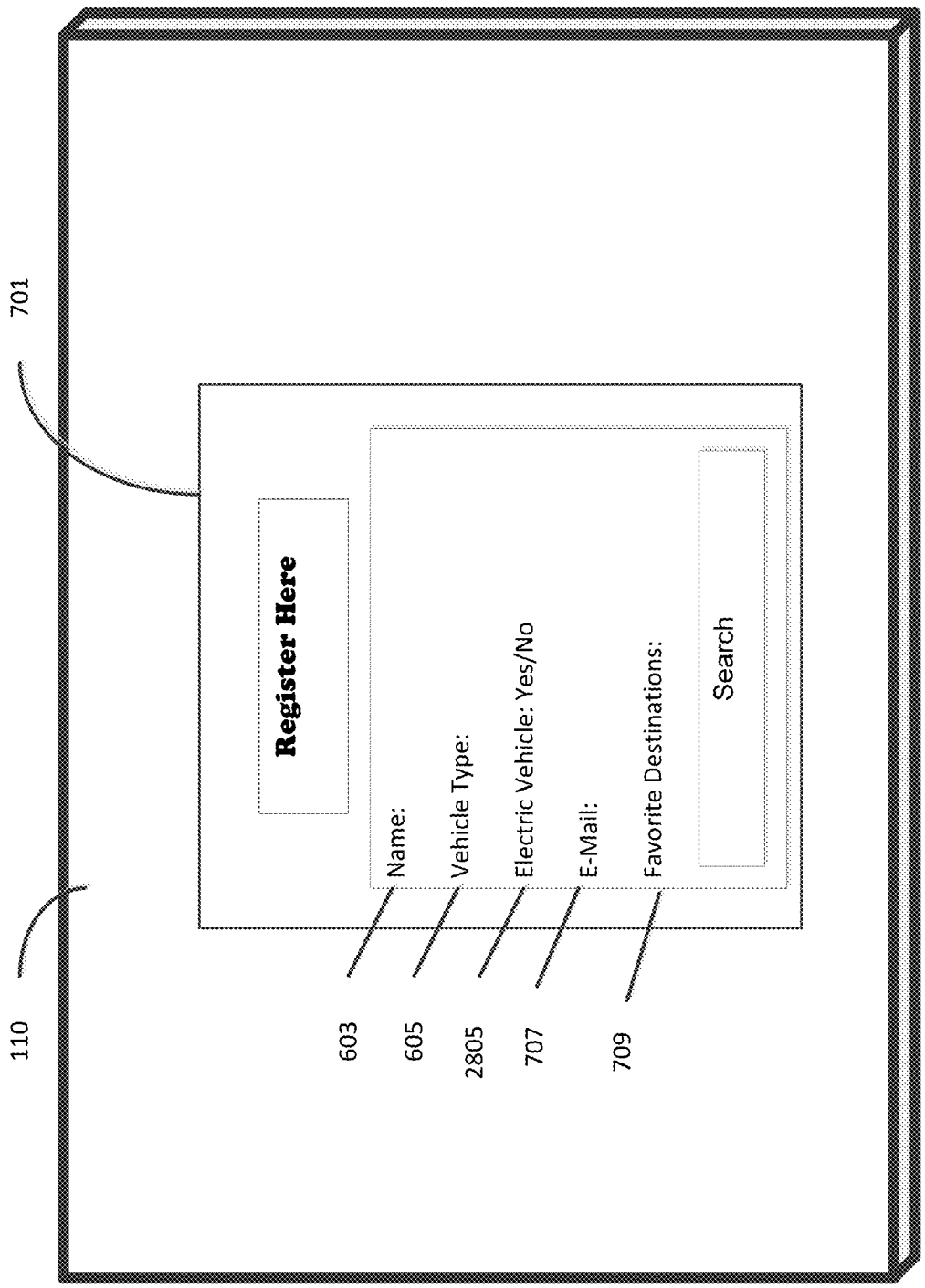
FIG. 28 is an example display for a smart device according to an exemplary aspect of the disclosure.

FIG. 27 is a flowchart for a case where, in S2701, the embodiment determines a parking space based on a feature of the vehicle. For example, the parking space may be determined based on the size of the vehicle. The size of the vehicle may be a feature that had been entered when the vehicle is registered. Alternatively, the size of the vehicle may be input while the vehicle is at the entrance of the parking structure. In another example, the vehicle may be an electric vehicle and the driver may wish to park the vehicle in a space that includes a charging station to charge the vehicle. FIG. 28 is an example display for a smart display device according to an exemplary aspect of the disclosure. In an exemplary aspect, as shown in FIG. 28, when a person registers, a person may register the vehicle as an electric vehicle 2805. A parking space may be selected that includes a charging station. In some aspects, parking spaces may be designated for handicapped parking. A driver may indicate that the vehicle may be parked in a parking space that is designated for handicapped parking.

Figure 29:
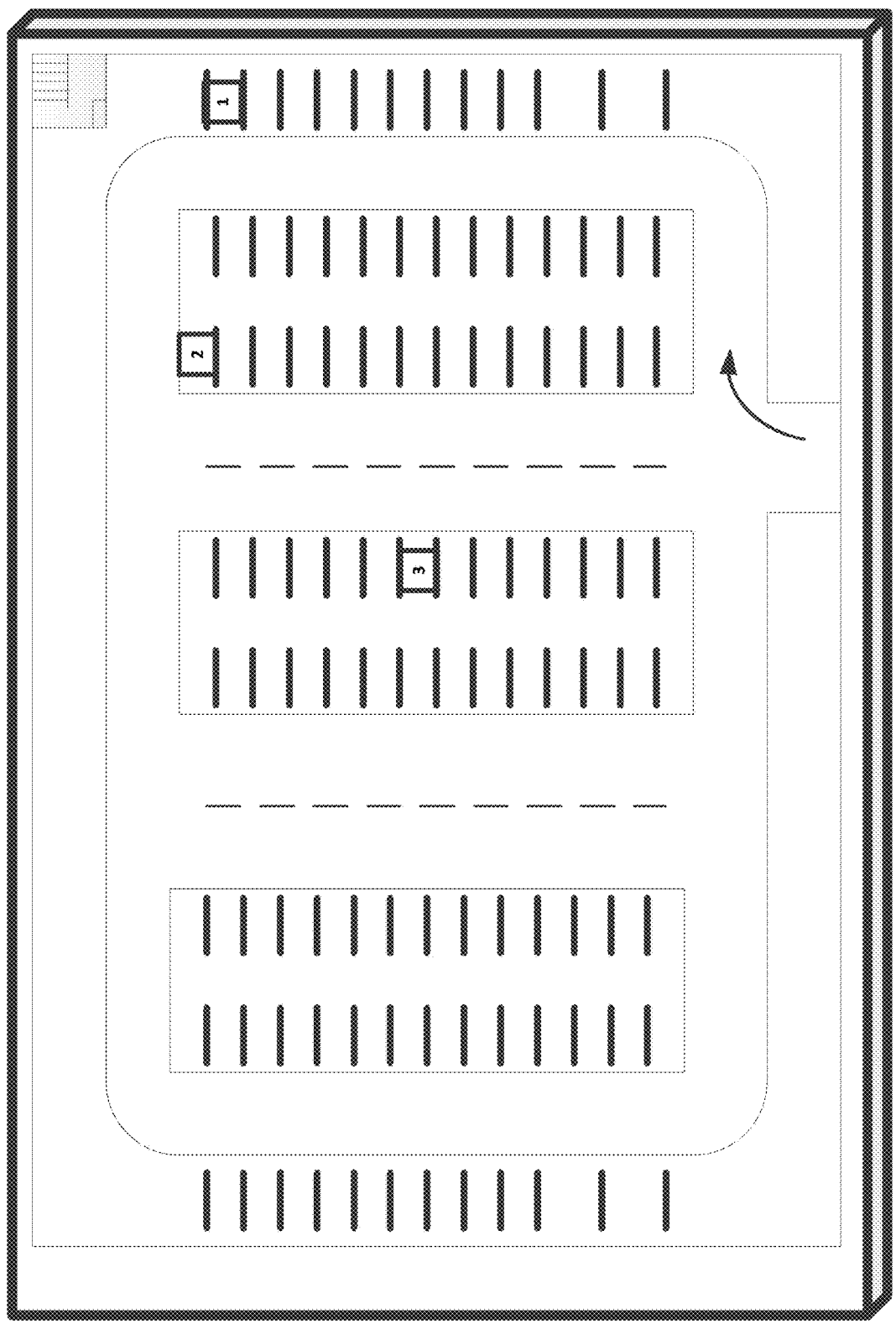
FIG. 29 is an example display for a smart device according to an exemplary aspect of the disclosure.
Figure 30:
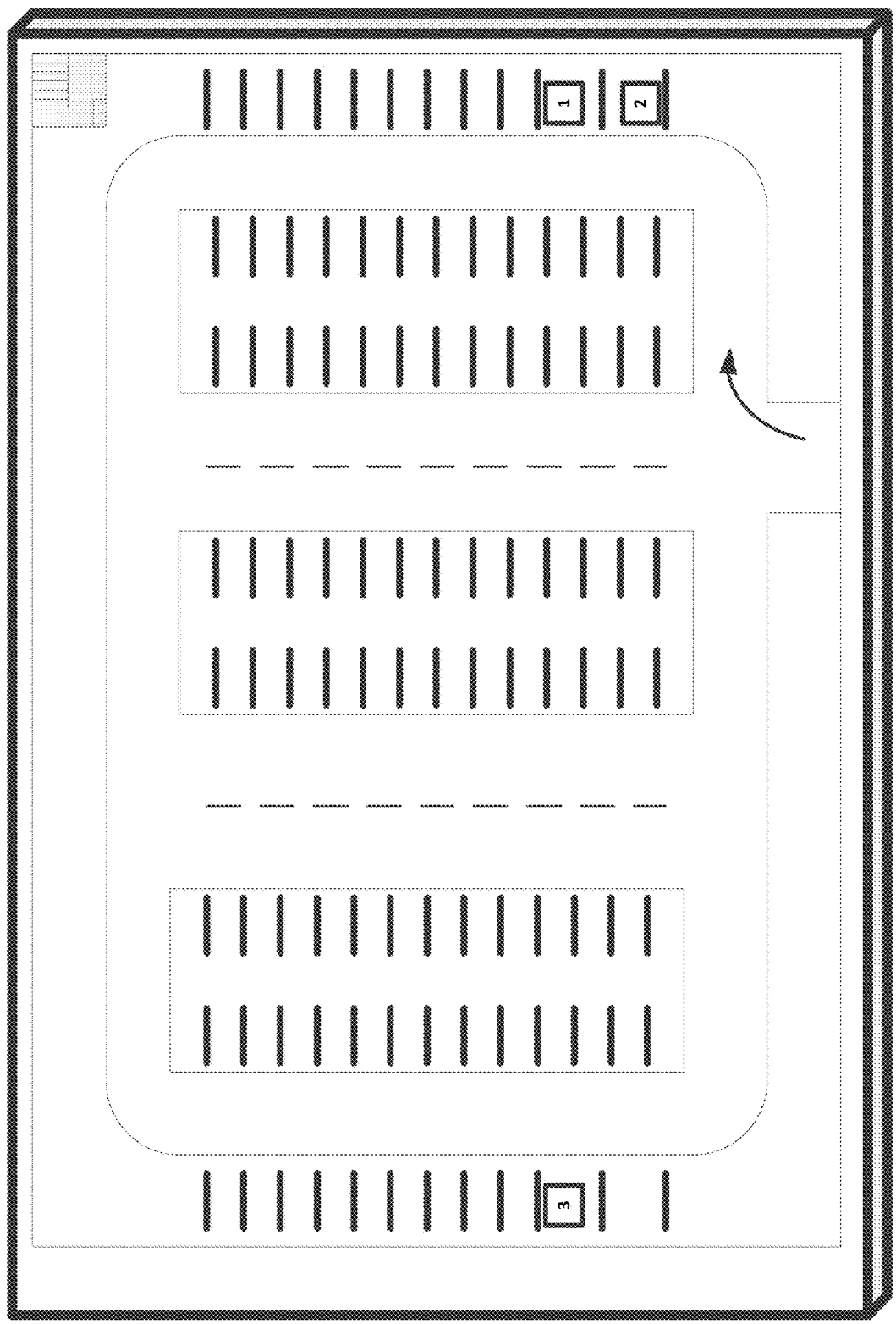
FIG. 30 is an example display for a smart device according to an exemplary aspect of the disclosure.

FIG. 29 is an example display for a smart display device according to an exemplary aspect of the disclosure. FIG. 29 illustrates prioritized available parking spaces in an interactive map of a parking structure. The driver may select a parking space from among the displayed parking spaces. FIG. 30 is an example display for a smart display according to an exemplary aspect of the disclosure. FIG. 30 illustrates an interactive map displaying available parking spaces based on a feature of the vehicle, such as size of the vehicle, or whether the vehicle is to be parked in a space having a charging station.

Figure 31:
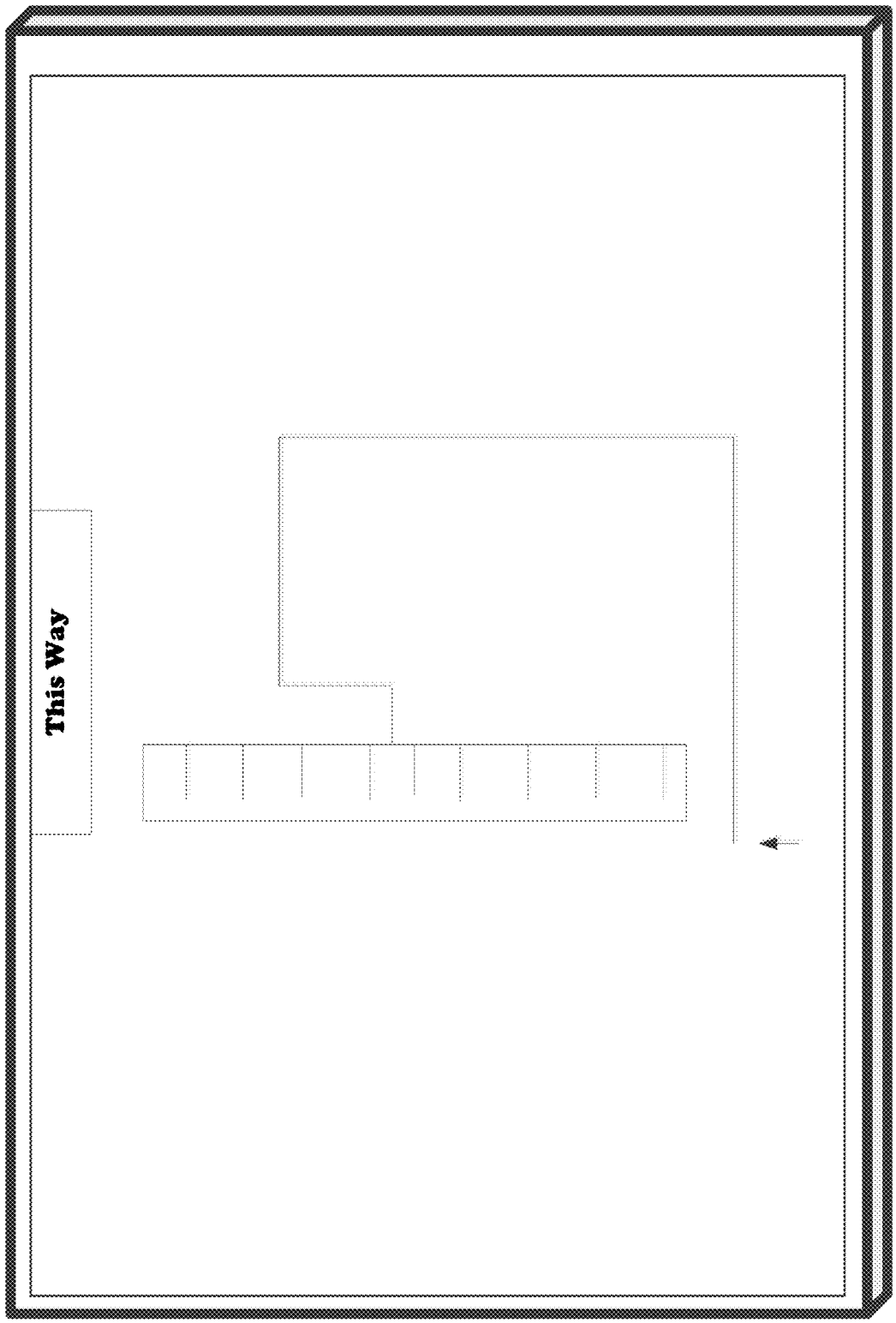
FIG. 31 is an example display for a smart device according to an exemplary aspect of the disclosure.

Referring back to FIG. 4, in S413 the embodiment may guide the vehicle to the selected parking space by generating a route to the parking space. In S415, the route to the parking space may be displayed. FIG. 31 is an example display for a smart display device and illustrates an example display of a route to a selected parking space.

Figure 32:
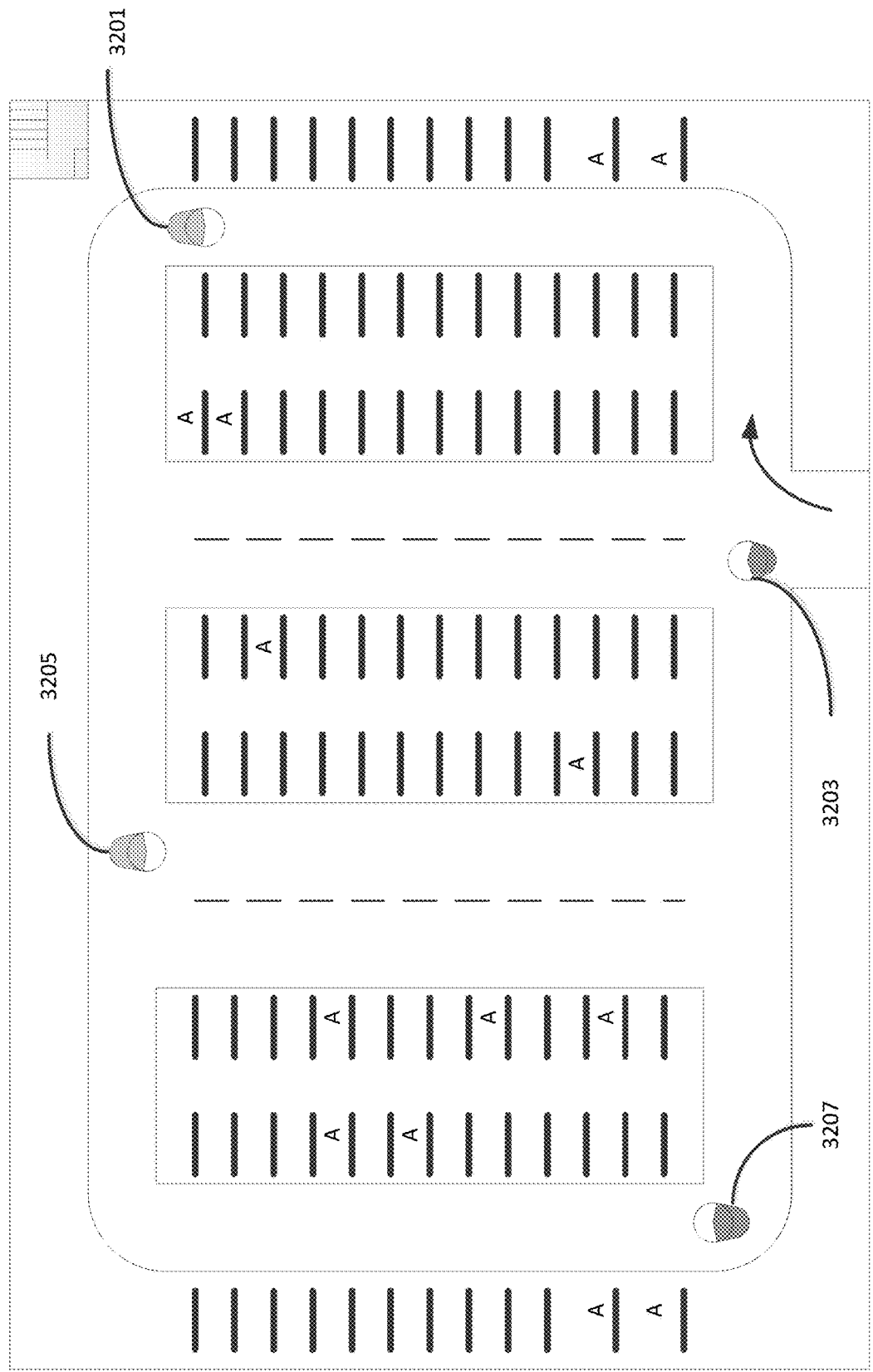
FIG. 32 is an example display for a smart device according to an exemplary aspect of the disclosure.

In S417 (YES), in a case that a parking structure includes one or more cameras, a live view of the parking structure may be obtained. For example, FIG. 32 illustrates a level of a parking structure which includes cameras 3201, 3203, 3205, 3207. The cameras may be located at positions that provide a view of each isle of the parking structure. In some cases, cameras may be located at particular parking spaces. A camera associated with a selected parking space may be used to provide a view of the parking space. Subsequently, in S419 a live view of a selected parking space may be displayed in the driver's vehicle. In S421, a live view of an aisle in the path to the selected parking space.

In S423 (YES), in a case that a parking structure has displays, in S425 the displays may be used to guide a vehicle to a parking space.

In S427, in the case that a parking structure is busy due to traffic conditions, the route to the parking space may be altered to include aisles that have fewest vehicles that are also approaching parking spaces.

In S429, in the case that a vehicle is actually parked at a location different from a selected parking space, in S431 the information of the actually parked position may be stored so that the driver may be able to locate the position of the parked vehicle at a later time. For example, the driver may look up a display of the parking structure using a mobile device, and the display may show the position in the structure where the vehicle is parked.

Figure 33:
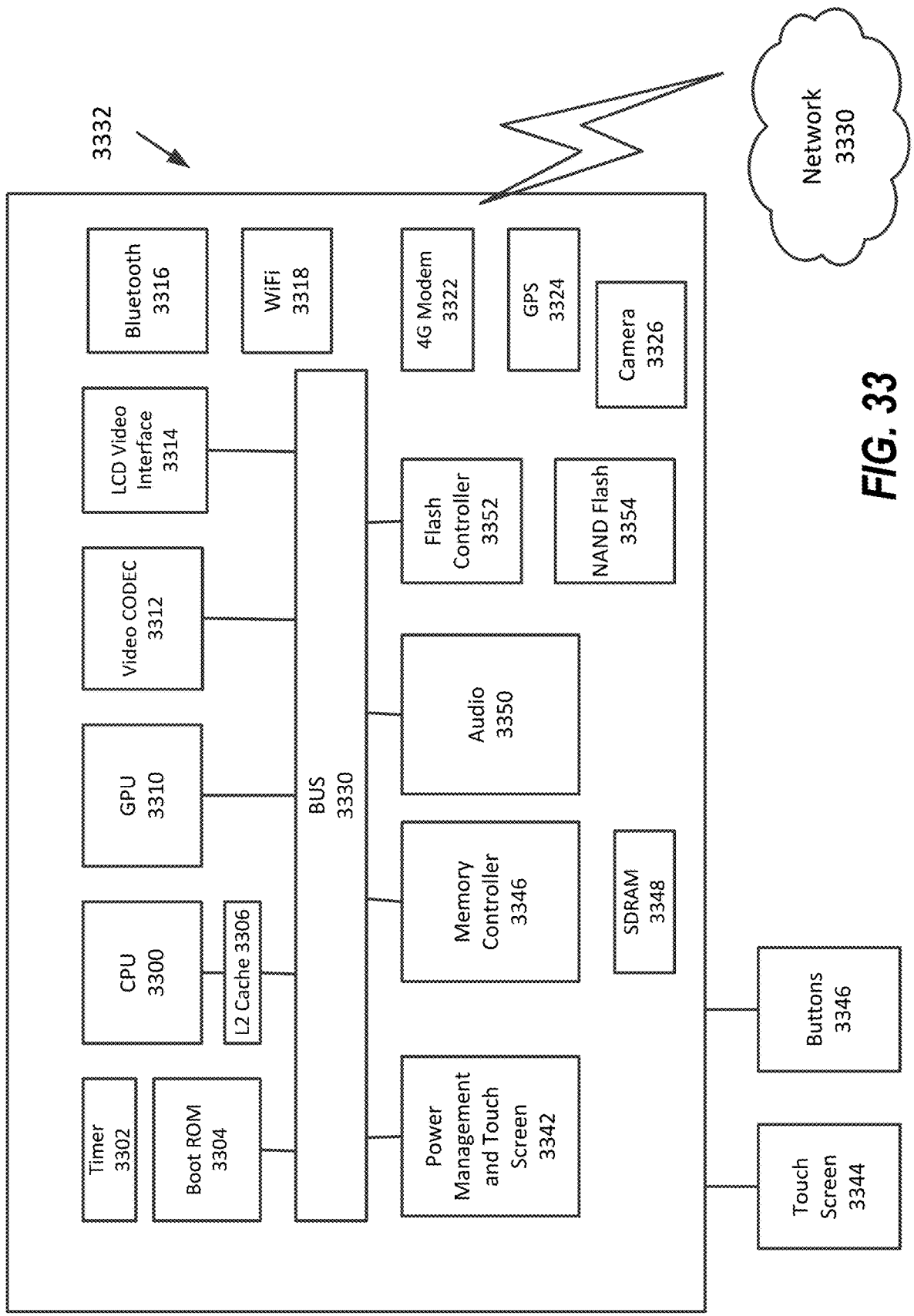
FIG. 33 is a block diagram for a smart device according to an exemplary aspect of the disclosure.

In one implementation, the functions and processes of the smart display device 110 or mobile device 330 may be implemented by a computer 3332. Next, a hardware description of the computer 3332 according to exemplary embodiments is described with reference to FIG. 33. In FIG. 33, the computer 3332 includes a CPU 3300 which performs the processes described herein. The process data and instructions may be stored in memory, such as SDRAM 3348. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 3332 communicates, such as a server or computer.

Further, the claimed advancements may be provided as a utility application, background daemon, or component of an operating system, or combination thereof, executing in conjunction with CPU 3300 and an operating system such as LINUX®, Microsoft Windows® and other systems known to those skilled in the art.

In order to achieve the computer 3332, the hardware elements may be realized by various circuitry elements, known to those skilled in the art. For example, CPU 3300 may be a quad-core ARM processor from Qualcomm, or an Intel Atom processor, or may be other processor types that would be recognized by one of ordinary skill in the art. The CPU 3300 may also include a Cache 3306 and a GPU 3310. Special purposes devices include a timer 3302, a boot ROM 3304, power management and touch screen control 3342, flash 3354 and an associated flash controller 3352. Alternatively, the CPU 3300 may be implemented on an FPGA, ASIC, PLD or using discrete logic circuits, as one of ordinary skill in the art would recognize. Further, CPU 3300 may be implemented as multiple processors cooperatively working in parallel to perform the instructions of the inventive processes described above.

The computer 3332 in FIG. 33 also includes various communications processors, including a Bluetooth processor 3316, WiFi processor 3322, a modem 3322 for cellular communication, and a GPS processor 3324. As can be appreciated, the network 3330 can be a public network, such as the Internet, or a private network such as LAN or WAN network, or any combination thereof and can also include PSTN or ISDN sub-networks. The network 3330 can also be wired, such as an Ethernet network, or can be wireless.

The computer 3332 further includes a video processor 3312 and a LCD Video interface 3314. The computer 3332 may include a touch screen 3344, buttons 3346, and one or more cameras 3326.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A parking navigation system comprising:
a vehicle including an in-vehicle computer system having
at least one processor and associated memory device;
a wireless communication circuit; and
a display, and
a server, wherein
the memory device stores an application program having instructions which when executed by the at least one processor cause the at least one processor to perform:
detecting, via the wireless communication circuit, entry into a parking structure, the parking structure including a capability of identifying open parking spaces;
synchronizing, via the wireless communication circuit, the vehicle with the parking structure;
determining an available parking space in the parking structure;
generating a route to the available parking space;
displaying, via the display, a map having the route to the available parking space; and
displaying a registration interface to submit vehicle information and favorite destinations to the server, and
the server is configured to push messages that provide update information on parking space availability for parking structures proximate to at least one of the favorite destinations before entry into the parking structure.

2. The parking navigation system of claim 1, wherein the instructions further cause the at least one processor to perform:
displaying, via the display, a schedule for a time to go to the parking structure based on historical parking information received from the server.

3. The parking navigation system of claim 1, wherein the instructions further cause the at least one processor to perform displaying, via the display, statuses of parking spaces in the parking structure.

4. The parking navigation system of claim 1, wherein the instructions further cause the at least one processor to perform:
accepting input of a destination location;
determining a nearest parking structure nearest to the destination location based on parking information maintained in the server; and
displaying, via the display, statuses of parking spaces in the nearest parking structure.

5. The parking navigation system of claim 1, wherein the instructions further cause the at least one processor to perform:
displaying, via the display, a live view of a chosen parking space; and
displaying, via the display, a live view of a path to the chosen parking space.

6. The parking navigation system of claim 1, wherein the instructions further cause the at least one processor to perform:
displaying, via the display, a list of prioritized parking spaces; and
accepting input of a parking space among the list of prioritized spaces.

7. The parking navigation system of claim 1, wherein the parking structure includes displays for directing traffic that guide the vehicle to the available parking space.

8. The parking navigation system of claim 7, wherein the vehicle is guided based on detection of a license plate of the vehicle.

9. The parking navigation system of claim 1, wherein the available parking space is determined based on a size of the vehicle.

10. The parking navigation system of claim 1, wherein the available parking space is determined based on whether the vehicle is an electric vehicle that requires charging.

11. The parking navigation system of claim 1, wherein the route to the available parking space is dynamically adjusted based on traffic conditions within the parking structure.

12. A parking navigation system comprising:
a mobile device having
at least one processor and associated memory device;
a wireless communication circuit;
a geolocation system; and
a display, wherein
the memory device stores a mobile app having instructions which when executed by the at least one processor cause the at least one processor to perform:
detecting, via the wireless communication circuit, entry into a parking structure, the parking structure including a capability of identifying open parking spaces;
synchronizing, via the wireless communication circuit, a vehicle with the parking structure;
determining an available parking space in the parking structure;
generating a route to the available parking space;
displaying a map, via the geolocation system, having the route to the parking space; and
displaying a registration interface to submit vehicle information and favorite destinations to a server, and
the server is configured to push messages that provide update information on parking space availability for parking structures proximate to at least one of the favorite destinations before entry into the parking structure.

13. A parking navigation system comprising:
a mobile device having at least one processor configured to:
determine an available parking space in a parking structure;
generate a route to the available parking space;

display a map having the route to the available parking space;
accept registration of vehicle information and favorite destinations;
submit the vehicle information and the favorite destinations to a server; and
receive push messages that provide update information on parking space availability for parking structures proximate to at least one of the favorite destinations from the server before entry into the parking structure.

14. The parking navigation system of claim 12, further comprising the server, wherein the instructions further cause the at least one processor to perform:
displaying, via the display, a schedule for a time to go to the parking structure based on historical parking information received from the server.

15. The parking navigation system of claim 12, wherein the instructions further cause the at least one processor to perform: displaying, via the display, statuses of parking spaces in the parking structure.

16. The parking navigation system of claim 1, further comprising:
after detecting entry into the parking structure:
displaying, via the display, an interactive map of a vicinity of the parking structure;
accepting input of a destination in the vicinity of the parking structure; and
determining the available parking space based on relative proximity of the available parking space and the destination.

* * * * *